United States Patent
McGrath et al.

(10) Patent No.: US 6,807,616 B1
(45) Date of Patent: Oct. 19, 2004

(54) MEMORY ADDRESS CHECKING IN A PROCCESOR THAT SUPPORT BOTH A SEGMENTED AND A UNSEGMENTED ADDRESS SPACE

(75) Inventors: Kevin J. McGrath, Los Gatos, CA (US); Chetana N. Keltcher, Sunnyvale, CA (US); Ramsey W. Haddad, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 546 days.

(21) Appl. No.: 09/927,023

(22) Filed: Aug. 9, 2001

(51) Int. Cl.[7] .............................................. G06F 12/10
(52) U.S. Cl. ...................... 711/206; 711/207; 711/208; 711/209; 712/210
(58) Field of Search ................................ 711/202, 203, 711/206, 207, 208, 209; 712/210, 244

(56) References Cited

U.S. PATENT DOCUMENTS

| | | | | |
|---|---|---|---|---|
| 5,584,005 A | * | 12/1996 | Miyaoku et al. ............. | 711/206 |
| 5,642,491 A | * | 6/1997 | Rose et al. ...................... | 711/2 |
| 5,774,686 A | * | 6/1998 | Hammond et al. .......... | 712/209 |
| 5,826,074 A | * | 10/1998 | Blomgren .................... | 712/234 |
| 5,854,913 A | * | 12/1998 | Goetz et al. ................. | 712/210 |
| 5,913,058 A | * | 6/1999 | Bonola .......................... | 713/2 |
| 5,918,056 A | * | 6/1999 | Christie ....................... | 710/260 |
| 6,223,271 B1 | * | 4/2001 | Cepulis ........................ | 711/206 |
| 6,237,078 B1 | * | 5/2001 | Gray ............................. | 712/32 |
| 6,289,431 B1 | * | 9/2001 | Bigbee et al. ............... | 711/206 |
| 6,349,380 B1 | * | 2/2002 | Shahidzadeh et al. ...... | 712/211 |
| 6,393,544 B1 | * | 5/2002 | Bryg et al. .................. | 711/220 |
| 6,496,923 B1 | * | 12/2002 | Gruner et al. .............. | 712/213 |
| 2002/0019902 A1 | * | 2/2002 | Christie ....................... | 710/260 |

OTHER PUBLICATIONS

*The Technology Behind Crusoe™ Processors, Low–Power x86–Compatible Processors Implemented with Code Morphing™ Software*, Transmeta Corporation, Jan. 2000, pp. 1–18.

(List continued on next page.)

*Primary Examiner*—Kevin Verbrugge
*Assistant Examiner*—Jasmine Sorg
(74) *Attorney, Agent, or Firm*—Lawrence J. Merkel; Meyertons, Hood, Kivlin, Kowert & Goetzel, P.C.

(57) ABSTRACT

A processor supports several operating modes. In at least one of the operating modes, a segmented address space is used. In at least one other operating mode, an unsegmented address space is used. In the unsegmented address space, a canonical check applies to addresses. In the segmented address space, a segment limit check applies. In some cases, both a segment limit check and a canonical check applies dependent on the segment used (e.g. either user or table segments). An exception circuit selects one or more of the canonical check result(s) and the segment limit check result to generate an exception indication. The selection is dependent on the operating mode and the segment of the data reference. The processor may also perform selective truncation of addresses based on the operating mode and the segment.

33 Claims, 15 Drawing Sheets

OTHER PUBLICATIONS

*Alpha Learns to Do Windows; Digital's FX!32 is The Key to Running Win32 Software on Alpha/Windows NT.*, Selinda Chiquoine, BYTE, Aug. 4, 1998, 4 pages.

*Awards Stack Up for Digital FX!32 Windows Compatibility Software for Alpha*, Digital Press Release, Dec. 11,1 997, 7 pages.

*Digital FX!32; White Paper: How Digital FX!32 Works*, Digital Semiconductor, Jan. 26, 1998, 4 pages.

*An Alpha in PC Clothing; Digital Equipment's New x86 Emulator Technology Makes An Alpha System a Fast x86 Clone*, Tom Thompson, BYTE, Aug. 4, 1998, 7 pages.

*AMD 64–Bit Technology; The AMD x86 Architecture Programmers Overview*, AMD, Publication #24108 Rev: A. Aug. 2000, p. 1–106.

*AMD 64–Bit Technology; The AMD x86–64 Architecture Programmers Overview*, AMD, Pulication #24108 Rev: C, Jan. 2001, pp. 1–128.

*Intel Architecture Software Developer's Manual, vol. 1: Basic Architecture*, © Intel Corporation 1996, 1997, pp. 3–1 through 3–15.

*Pentium® Pro Family Developer's Manual, vol. 3: Operating System Writer's Guide*, © Intel Corporation 1996, Chapters 2–4, pp. 2–1 through 4–29.

*Alpha 21264 Microprocessor Hardware Reference Manual*, Compaq Computer Corporation, 1999, pp. 5–4 to 5–6.

*PowerPC Microprocessor Family: The Programming Environments*, Motorola, Inc., 1997, Chapter 4 pages 4–1 to 4–9, Chapter 7 pages 7–1 to 7–124.

* cited by examiner

| LMA | CS L Bit | CS D Bit | Operating Mode |
|---|---|---|---|
| 0 | x | 0 | 16 Bit Mode |
| 0 | x | 1 | 32 Bit Mode |
| 1 | 0 | 0 | 16 Bit Compatibility Mode |
| 1 | 0 | 1 | 32 Bit Compatibility Mode |
| 1 | 1 | 0 | 32/64 Mode |
| 1 | 1 | 1 | Reserved |

MEMORY ADDRESS CHECKING IN A PROCCESOR THAT SUPPORT BOTH A SEGMENTED AND A UNSEGMENTED ADDRESS SPACE

BACKGROUND OF THE INVENTION

1. Field of the Invention

This invention is related to the field of processors and, more particularly, to data reference address checking in processors.

2. Description of the Related Art

The x86 architecture (also known as the IA-32 architecture) has enjoyed widespread acceptance and success in the marketplace. Accordingly, it is advantageous to design processors according to the x86 architecture. Such processors may benefit from the large body of software written to the x86 architecture (since such processors may execute the software and thus computer systems employing the processors may enjoy increased acceptance in the market due to the large amount of available software).

As computer systems have continued to evolve, 64 bit address size (and sometimes operand size) has become desirable. A larger address size allows for programs having a larger memory footprint (the amount of memory occupied by the instructions in the program and the data operated upon by the program) to operate within the memory space. A larger operand size allows for operating upon larger operands, or for more precision in operands. More powerful applications and/or operating systems may be possible using 64 bit address and/or operand sizes.

Unfortunately, the x86 architecture is limited to a maximum 32 bit operand size and 32 bit address size. The operand size refers to the number of bits operated upon by the processor (e.g. the number of bits in a source or destination operand). The address size refers to the number of bits in an address generated by the processor. Thus, processors employing the x86 architecture may not serve the needs of applications which may benefit from 64 bit address or operand sizes.

The x86 architecture defines a segmented address space. With segmentation, the address space is divided into a set of variable sized segments. Segment descriptors are used to describe the segments, including a base address and limit which define the boundaries of the segment.

SUMMARY OF THE INVENTION

A processor is described which supports several operating modes. In at least one of the operating modes, a segmented address space is used. In at least one other operating mode, an unsegmented address space is used. In the unsegmented address space, a canonical check applies to addresses. In the segmented address space, a segment limit check applies. In some cases, both a segment limit check and a canonical check applies dependent on the segment used (e.g. either user or table segments). In one example, the processor may include an address generation unit and a load/store unit used to perform data references. The address generation unit may generate an effective address of the data reference and may perform a canonical check on the effective address, generating a first canonical check result. The load/store unit may add the effective address to a segment base address (which may be zero in unsegmented address space modes) to form a linear address and may perform a second canonical check on the linear address, generating a second canonical check result. Additionally, a segment limit check may be performed on the effective address to produce a segment limit check result. An exception circuit selects one or more of the first canonical check result, the second canonical check result, and the segment limit check result to be used to generate an exception indication. The selection is dependent on the operating mode and the segment of the data reference.

The processor may also perform selective truncation of addresses based on the operating mode and the segment. Such truncation may replicate behavior in some operating modes which have an address size smaller than the implemented address space. Furthermore, some embodiments may employ a programmable mechanism for disabling truncation (e.g. a bit in a special purpose register or model specific register). The programmable mechanism, in conjunction with segment base addresses extended to the implemented address size, may be used to perform memory sizing in a mode in which the address size is less than the implemented address size.

Broadly speaking, an apparatus for a processor is contemplated. The apparatus comprises circuitry configured to perform one or more canonical checks for a data reference and a segment limit check on an effective address of the data reference. Additionally, the apparatus includes a first circuit coupled to the circuitry and coupled to receive an indication of an operating mode of the processor and an indication of the segment corresponding to the data reference. The first circuit is configured to select, responsive to the operating mode of the processor and the segment, one or more of: a first result of the segment limit check and a second result of the one or more canonical checks for generating an exception indication for the data reference.

Additionally, an apparatus for a processor is contemplated. The apparatus includes a circuit configured to output an address of a data reference and a control circuit. The circuit is coupled to receive a control input and is configured to output the address either truncated to a predetermined number of bits or not truncated dependent on the control input. The control circuit is configured to generate the control input responsive to a segment of the data reference and an operating mode of the processor.

Moreover, a method is contemplated. An indication in a register is set to a first state which prevents truncation of data reference addresses. A plurality of data references are performed to determine a size of memory included in a system. The indication is set to a second state which allows truncation of data reference addresses.

BRIEF DESCRIPTION OF THE DRAWINGS

The following detailed description makes reference to the accompanying drawings, which are now briefly described.

FIG. 4 is a table illustrating one embodiment of operating modes as a function of segment descriptor and control register values.

Figure 1:
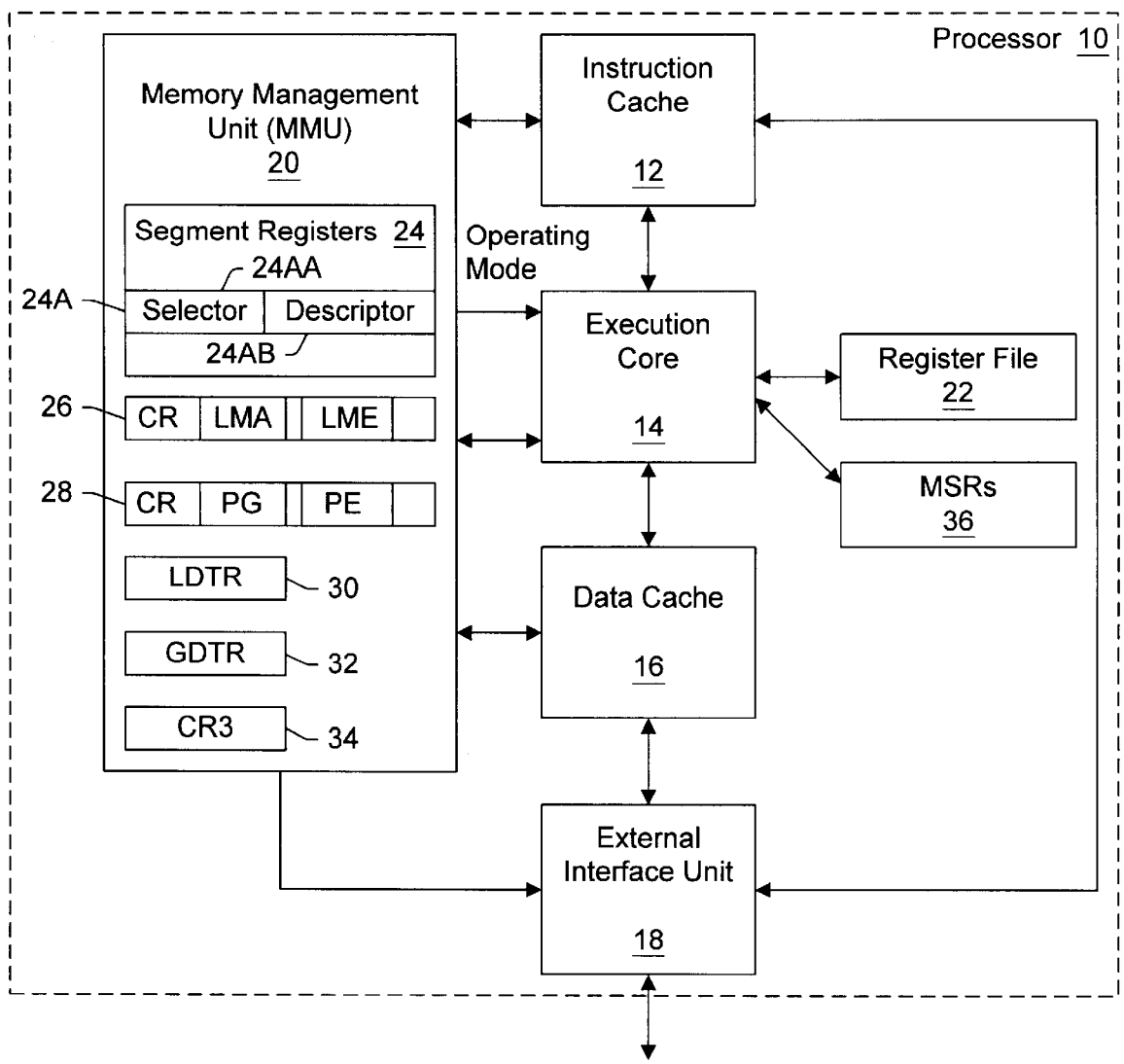
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Processor Overview

Turning now to FIG. 1, a block diagram illustrating one embodiment of a processor 10 is shown. Other embodiments are possible and contemplated. In the embodiment of FIG. 1, processor 10 includes an instruction cache 12, an execution core 14, a data cache 16, an external interface unit 18, a memory management unit (MMU) 20, a register file 22, and a set of model specific registers (MSRs) 36. In the illustrated embodiment, MMU 20 includes a set of segment registers 24, a first control register 26, a second control register 28, a local descriptor table register (LDTR) 30, a global descriptor table register (GDTR) 32, and a page table base address register (CR3) 34. Instruction cache 12 is coupled to external interface unit 18, execution core 14, and MNU 20. Execution core 14 is further coupled to MMU 20, register file 22, MSRs 36, and data cache 16. Data cache 16 is further coupled to MMU 20 and external interface unit 18. External interface unit 18 is further coupled to MMU 20 and to an external interface.

Processor 10 may employ a processor architecture compatible with the x86 architecture (also known as the IA-32 architecture) and including additional architectural features to support 64 bit processing. More particularly, the processor architecture employed by processor 10 may define a mode, referred to below as "long mode". Long mode is a mode in which 64 bit processing is selectable as an operating mode, as well as 32 bit or 16 bit processing as specified in the x86 architecture. More particularly, long mode may provide for an operating mode in which virtual addresses may be greater than 32 bits in size.

Processor 10 may implement a mechanism allowing for orderly transition to and from long mode, even though multiple registers may be changed to perform the transition. Particularly, processor 10 may employ a long mode active (LMA) indication in a control register (e.g. control register 26 in the present embodiment, although the LMA indication may be stored in any control register, including control registers not storing the LME indication). The processor 10 may use the LMA indication as the indication of whether or not long mode is active (i.e. whether or not the processor is operating in long mode). However, the LMA indication may not be modified directly via an instruction. Instead, an instruction is used to change the state of the LME indication to indicate whether or not long mode is desired. Long mode may be activated (as indicated by the LMA indication) via the combination of enabling paging (as indicated by the PG indication in control register 28 and described in more detail below) and the LME indication indicating that long mode is desired. Viewed in another way, the LME indication may be used to enable the transition to long mode. The LMA indication may indicate whether or not the transition has successfully occurred, and thus indicates whether processor 10 is operating according to the long mode definition or processor 10 is operating according to the legacy definition of the x86 processor architecture.

Processor 10 is configured to establish an operating mode in response to information stored in a code segment descriptor corresponding to the currently executing code and further in response to one or more enable indications stored in one or more control registers. As used herein, an "operating mode" specifies default values for various programmably selectable processor attributes. For example, the operating mode may specify a default operand size and a default address size. The default operand size specifies the number of bits in an operand of an instruction, unless an instruction's encoding overrides the default. The default address size specifies the number of bits in an address of a memory operand of an instruction, unless an instruction's encoding overrides the default. The default address size specifies the size of at least the virtual address of memory operands. As used herein, a "virtual address" is an address generated prior to translation through an address translation mechanism (e.g. a paging mechanism) to a "physical address", which is the address actually used to access a memory. Additionally, as used herein, a "segment descriptor" is a data structure created by software and used by the processor to define a segment of memory and to further define access control and status for the segment. A "segment descriptor table" is a table in memory storing segment descriptors. Since there is more than one operating mode, the operating mode in effect at any given time may be described as being the "active" operating mode.

In the illustrated embodiment, MMU 20 generates an operating mode and conveys the operating mode to execution core 14. Execution core 14 executes instructions using the operating mode. More particularly, execution core 14 fetches operands having the default operand size from register file 22 or memory (through data cache 16, if the memory operands are cacheable and hit therein, or through external interface unit 18 if the memory operands are noncacheable or miss data cache 16) unless a particular instruction's encoding overrides the default operand size, in which case the overriding operand size is used. Similarly, execution core 14 generates addresses of memory operands, wherein the addresses have the default address size unless a particular instruction's encoding overrides the default address size, in which case the overriding address size is used. In other embodiments, the information used to generate the operating mode may be shadowed locally in the portions of processor 10 which use the operating mode (e.g. execution core 14), and the operating mode may be determined from the local shadow copies.

As mentioned above, MMU 20 generates the operating mode responsive to a code segment descriptor corresponding to the code being executed and further responsive to one or more values in control registers. Information from the code segment descriptor is stored in one of the segment registers 24 (a register referred to as CS, or code segment). Additionally, control register 26 stores an enable indication (LME) which is used to enable transition to long mode and the LMA indication indicating whether or not long mode is active. In long mode, an operating mode in which the default address size is greater than 32 bits ("32/64 mode") as well as certain compatibility modes for the 32 bit and 16 bit operating modes may be available using the segment descriptor indications. The default operand size may be 32 bits in 32/64 mode, but instructions may override the default 32 bit operand size with a 64 bit operand size when desired. If the LME indication is in an enabled state, then long mode may be activated. If the LME indication is in a disabled state, then long mode may not be activated. In one embodiment, the default address size in 32/64 mode may be implementation-dependent but may be any value up to and including 64 bits. Furthermore, the size of the virtual address may differ in a given implementation from the size of the physical address in that implementation.

It is noted that various indications are described herein (e.g. LMA, LME, etc.). Generally, an indication is a value which may be placed into two or more states. Each state may be assigned a meaning. Some of the indications described herein (including some enable indications) may be described as bits. The bit being set may be one state (e.g. the enabled state for enable indications) and the bit being clear may be the other state (e.g. the disabled state for enable indications). However, other encodings are possible, including encodings in which multiple bits are used and encodings in which the enabled state is the clear state and the disabled state is the set state. Accordingly, the remainder of this description may refer to the LME indication in control register 26 as the LME bit, with the enabled state being set and the disabled state being clear. However, other encodings of the LME indication are contemplated, as set forth above. Similarly, the LMA indication may be referred to as the LMA bit, with the set state indicating that long mode is active and the clear state indicating that long mode is inactive. However, other encodings of the LMA indication are contemplated, as set forth above.

Segment registers 24 store information from the segment descriptors currently being used by the code being executed by processor 10. As mentioned above, CS is one of segment registers 24 and specifies the code segment of memory. The code segment stores the code being executed. Other segment registers may define various data segments (e.g. a stack data segment defined by the SS segment register, and up to four data segments defined by the DS, ES, FS, and GS segment registers). FIG. 1 illustrates the contents of an exemplary segment register 24A, including a selector field 24AA and a descriptor field 24AB. Selector field 24AA is loaded with a segment selector to activate a particular segment in response to certain segment load instructions executed by execution core 14. The segment selector locates the segment descriptor in a segment descriptor table in memory. More particularly, processor 10 may employ two segment descriptor tables: a local descriptor table and a global descriptor table. The base address of the local descriptor table is stored in the LDTR 30. Similarly, the base address of the global descriptor table is stored in GDTR 32. A bit within the segment selector (the table indicator bit) selects the descriptor table, and an index within the segment selector is used as an index into the selected table. When an instruction loads a segment selector into one of segment registers 24, MMU 20 reads the corresponding segment descriptor from the selected segment descriptor table and stores information from the segment descriptor into the segment descriptor field (e.g. segment descriptor field 24AB for segment register 24A). The information stored in the segment descriptor field may comprise any suitable subset of the segment descriptor, including all of the segment descriptor, if desired. Additionally, other information derived from the segment descriptor or other sources may be stored in the segment descriptor field, if desired. For example, an embodiment may decode the operating mode indications from the code segment descriptor and store the decoded value rather than the original values of the operating mode indications. If an instruction causes CS to be loaded with a segment selector, the code segment may change and thus the operating mode of processor 10 may change.

In one embodiment, only the CS segment register is used in 32/64 mode. The data segment registers are ignored from the standpoint of providing segmentation information. In another embodiment, some of the data segment registers may be used to supply base addresses (the segment base portion of the descriptor field) for certain addressing calculations. For example, the FS and GS registers may be used in this fashion, while other segment features may be disabled for these segment registers and the other data segment registers may be ignored. In 16 and 32 bit modes, the code segment and data segments may be active. Furthermore, a second enable indication (PE) in control register 28 may affect the operation of MMU 20. The PE enable indication may be used to enable protected mode, in which segmentation and/or paging address translation mechanisms may be used. If the PE enable indication is in the disabled state, segmentation and paging mechanisms are disabled and processor 10 is in "real mode" (in which addresses generated by execution core 14 are physical addresses). Similar to the LME indication, the PE indication may be a bit in which the enabled state is the bit being set and the disabled state is the bit being clear. However, other embodiments are contemplated as described above. Generally, a "protected mode" is a mode in which various hardware and/or software mechanisms are employed to provide controlled access to memory.

Control register 28 is further illustrated in FIG. 1 as storing a paging enable indication (PG). The PG indication may indicate whether or not paging is enabled. As mentioned above, the LMA bit is set once paging is enabled and the LME bit is set. As used herein, the term "paging" or "paging address translation" refers to the translation of virtual addresses to physical addresses using mappings stored in a page table structure indicated by the page table base address register 34. A given page mapping maps any virtual address having the same virtual page number to a corresponding physical address in a page of physical memory. The page table is a predefined table of entries stored in memory. Each of the entries store information used to map virtual addresses to physical addresses.

It is noted that MU 20 may employ additional hardware mechanisms, as desired. For example, MMU 20 may include paging hardware to implement paging address translation from virtual addresses to physical addresses. The paging hardware may include a translation lookaside buffer (TLB) to store page translations.

It is noted that control registers 26 and 28 may be implemented as architected control registers (e.g. control register 26 may be CR4 and control register 28 may be CR0). Alternatively, one or both of the control registers may be implemented as model specific registers to allow for other uses of the architected control registers without interfering with 32/64 mode. Generally, the control registers are each addressable by one or more instructions defined in the processor architecture, so that the registers may be changed as desired.

Instruction cache 12 is a high speed cache memory for storing instruction bytes. Execution core 14 fetches instructions from instruction cache 12 for execution. Instruction cache 12 may employ any cache organization, including direct-mapped, set associative, and fully associative configurations. If an instruction fetch misses in instruction cache 12, instruction cache 12 may communicate with external interface unit 18 to fill the missing cache line into instruction cache 12. Additionally, instruction cache 12 may communicate with MMU 20 to receive physical address translations for virtual addresses fetched from instruction cache 12.

Execution core 14 executes the instructions fetched from instruction cache 12. Execution core 14 fetches register operands from register file 22 and updates destination registers in register file 22. The size of the register operands is controlled by the operating mode and any overrides of the operating mode for a particular instruction. Similarly, execution core 14 fetches memory operands from data cache 16 and updates destination memory locations in data cache 16, subject to the cacheability of the memory operands and hitting in data cache 16. The size of the memory operands is similarly controlled by the operating mode and any overrides of the operating mode for a particular instruction. Furthermore, the size of the addresses of the memory operands generated by execution core 14 is controlled by the operating mode and any overrides of the operating mode for a particular instruction.

Execution core 14 may also access or update MSRs 36 in response to read MSR (RDMSR) and write MSR (WRMSR) instructions, respectively.

Execution core 14 may employ any construction. For example, execution core 14 may be a superpipelined core, a superscalar core, or a combination thereof. Execution core 14 may employ out of order speculative execution or in order execution, according to design choice. Execution core 14 may include microcoding for one or more instructions or exception situations, in combination with any of the above constructions.

Register file 22 may include 64 bit registers which may be accessed as 64 bit, 32 bit, 16 bit, or 8 bit registers as indicated by the operating mode of processor 10 and any overrides for a particular instruction. The registers included in register file 22 may include the RAX, RBX, RCX, RDX, RDI, RSI, RSP, and RBP registers (which may be 64 bit versions of the EAX, EBX, ECX, EDX, EDI, ESI, ESP, and EBP registers defined in the x86 processor architecture, respectively). Additionally, in one embodiment, register file 22 may include additional registers addressed using a register extension (REX) prefix byte. Register file 22 may further include the RLP register, which may be a 64 bit version of the EIP register. Furthermore, register file 22 may include the EFLAGS register. Alternatively, execution core 14 may employ a form of register renaming in which any register within register file 22 may be mapped to an architected register. The number of registers in register file 22 may be implementation dependent for such an embodiment.

Data cache 16 is a high speed cache memory configured to store data. Data cache 16 may employ any suitable cache organization, including direct-mapped, set associative, and fully associative configurations. If a data fetch or update misses in data cache 16, data cache 16 may communicate with external interface unit 18 to fill the missing cache line into data cache 16. Additionally, if data cache 16 employs a writeback caching policy, updated cache lines which are being cast out of data cache 16 may be communicated to external interface unit 18 to be written back to memory. Data cache 16 may communicate with MMU 20 to receive physical address translations for virtual addresses presented to data cache 16.

External interface unit 18 communicates with portions of the system external to processor 10. External interface unit 18 may communicate cache lines for instruction cache 12 and data cache 16 as described above, and may communicate with MMU 20 as well. For example, external interface unit 18 may access the segment descriptor tables and/or paging tables on behalf of MMU 20.

It is noted that processor 10 may include an integrated level 2 (L2) cache, if desired. Furthermore, external interface unit 18 may be configured to communicate with a backside cache in addition to communicating with the system.

While the processor architecture described herein may be compatible with the x86 processor architecture for 16 and 32 bit modes, in one embodiment, other embodiments may employ any 16 and 32 bit modes. The other embodiments may or may not be compatible with the x86 processor architecture or any other processor architecture. It is further noted that, while a specific set of information is described herein as being used to generate the operating mode, any combination of indications and/or information from memory data structures such as segment descriptor tables and page tables may be used to generate the operating mode in various embodiments.

Figure 2:
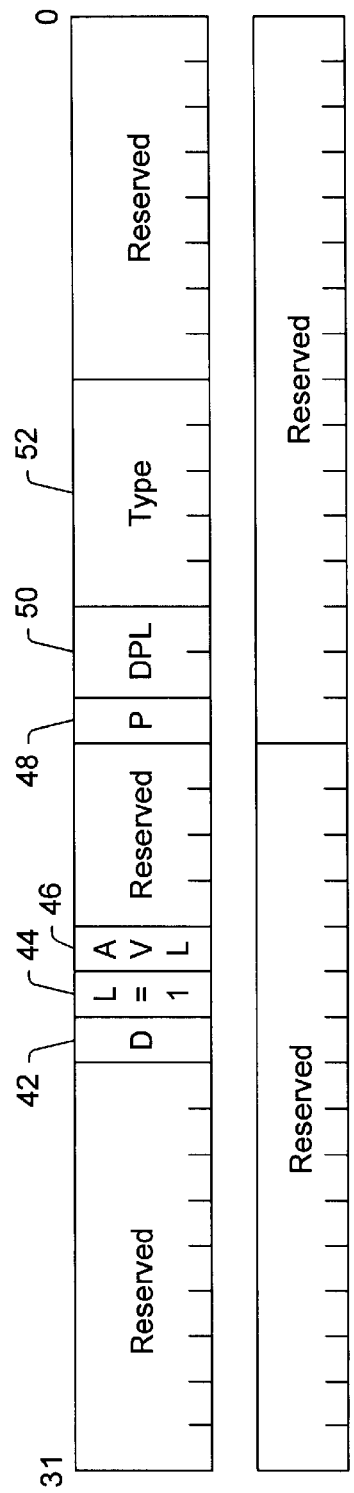
FIG. 2 is a block diagram of one embodiment of a segment descriptor for 32/64 mode.

Turning now to FIG. 2, a block diagram of one embodiment of a code segment descriptor 40 for 32/64 mode is shown. Other embodiments are possible and contemplated. In the embodiment of FIG. 2, code segment descriptor 40 comprises 8 bytes with the most significant 4 bytes illustrated above the least significant 4 bytes. The most significant four bytes are stored at a numerically larger address than the least significant four bytes. The most significant bit of each group of four bytes is illustrated as bit 31 in FIG. 2 (and FIG. 3 below), and the least significant bit is illustrated as bit 0. Short vertical lines within the four bytes delimit each bit, and the long vertical lines delimit a bit but also delimit a field (both in FIG. 2 and in FIG. 3).

Unlike the 32 bit and 16 bit code segment descriptors illustrated in FIG. 3 below, code segment descriptor 40 does not include a base address or limit. Processor 10 employs a flat virtual address space for 32/64 mode (rather than the segmented linear address space employed in 32 bit and 16 bit modes). Accordingly, the portions of code segment descriptor 40 which would otherwise store the base address and limit are reserved in segment descriptor 40. It is noted that a virtual address provided through segmentation may also be referred to herein as a "linear address". The term "virtual address" encompasses any address which is translated through a translation mechanism to a physical address actually used to address memory, including linear addresses and other virtual addresses generated in non-segmented architectures.

Segment descriptor 40 includes a D bit 42, an L bit 44 (set to one for a 32/64 mode code segment), an available bit (AVL) 46, a present (P) bit 48, a descriptor privilege level (DPL) 50, and a type field 52. D bit 42 and L bit 44 are used to determine the operating mode of processor 10, as illustrated in FIG. 4 below. AVL bit 46 is available for use by system software (e.g. the operating system). P bit 48 is used to indicate whether or not the segment is present in memory. If P bit 48 is set, the segment is present and code may be fetched from the segment. If P bit 48 is clear, the segment is not present and an exception is generated to load the segment into memory (e.g. from disk storage or through a network connection). The DPL indicates the privilege level of the segment. Processor 10 employs four privilege levels (encoded as 0 through 3 in the DPL field, with level 0 being the most privileged level). Certain instructions and processor resources (e.g. configuration and control registers) are only executable or accessible at the more privileged levels, and attempts to execute these instructions or access these resources at the lower privilege levels result in an exception. When information from code segment 40 is loaded into the CS segment register, the DPL becomes the current privilege level (CPL) of processor 10. Type field 52 encodes the type of segment. For code segments, the most significant bit two bits of type field 52 may be set (the most significant bit distinguishing a code or data segment from a system segment, and the second most significant bit distinguishing a code segment from a data segment), and the remaining bits may encode additional segment type information (e.g. execute only, execute and read, or execute and read only, conforming, and whether or not the code segment has been accessed).

It is noted that, while several indications in the code segment descriptor are described as bits, with set and clear values having defined meanings, other embodiments may employ the opposite encodings and may use multiple bits, as desired. Thus, for example, the D bit 42 and the L bit 44 may each be an example of an operating mode indication which may be one or more bits as desired, similar to the discussion of enable indications above.

Figure 3:
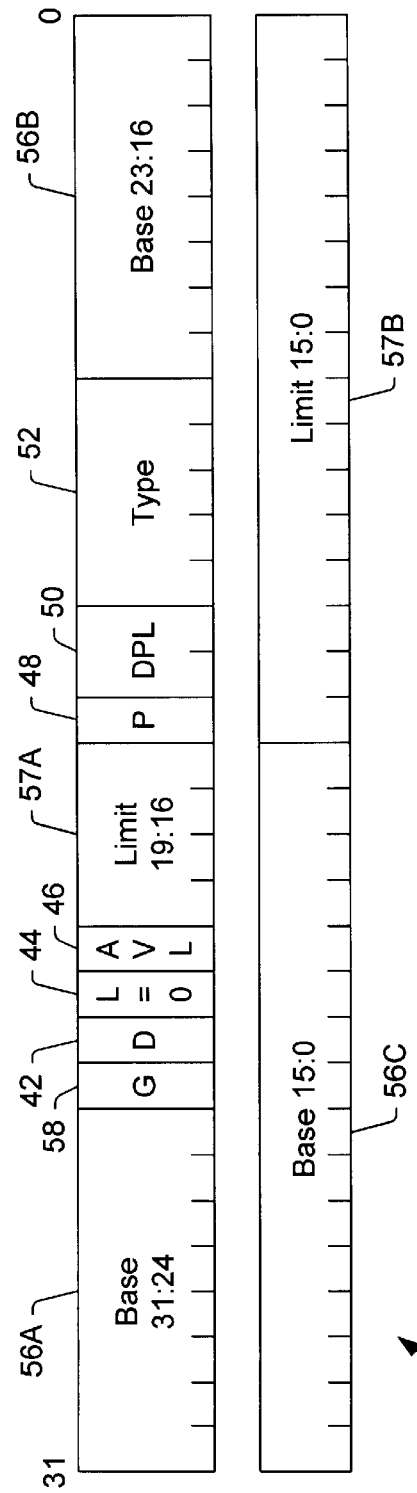
FIG. 3 is a block diagram of one embodiment of a segment descriptor for compatibility mode.

Turning now to FIG. 3, a block diagram of one embodiment of a code segment descriptor 54 for 32 and 16 bit compatibility mode is shown. Other embodiments are possible and contemplated. As with the embodiment of FIG. 2, code segment descriptor 54 comprises 8 bytes with the most significant 4 bytes illustrated above the least significant 4 bytes.

Code segment descriptor 54 includes D bit 42, L bit 44, AVL bit 46, P bit 48, DPL 50, and type field 52 similar to the above description of code segment descriptor 40. Additionally, code segment descriptor 54 includes a base address field (reference numerals 56A, 56B, and 56C), a limit field (reference numerals 57A and 57B) and a G bit 58. The base address field stores a base address which is added to the logical fetch address (stored in the RIP register) to form the linear address of an instruction, which may then optionally be translated to a physical address through a paging translation mechanism. The limit field stores a segment limit which defines the size of the segment. Attempts to access a byte at a logical address greater than the segment limit are disallowed and cause an exception. G bit 58 determines the scaling of the segment limit field. If G bit 58 is set the limit is scaled to 4K byte pages (e.g. 12 least significant zeros are appended to the limit in the limit field). If G bit 58 is clear, the limit is used as is.

It is noted that code segment descriptors for 32 and 16 bit modes when long mode is not active may be similar to code segment descriptor 54, except the L bit is reserved and defined to be zero. It is further noted that, in 32 and 16 bit modes (both compatibility mode with the LMA bit set and modes with the LMA bit clear) according to one embodiment, data segments are used as well. Data segment descriptors may be similar to code segment descriptor 54, except that the D bit 42 is defined to indicate the upper bound of the segment or to define the default stack size (for stack segments).

Turning next to FIG. 4, a table 70 is shown illustrating the states of the LMA bit, the L bit in the code segment descriptor, and the D bit in the code segment descriptor and the corresponding operating mode of processor 10 according to one embodiment of processor 10. Other embodiments are possible and contemplated. As table 70 illustrates, if the LMA bit is clear, then the L bit is reserved (and defined to be zero). However, processor 10 may treat the L bit as a don't care if the LMA bit is clear. Thus, the x86 compatible 16 bit and 32 bit modes may be provided by processor 10 if the LMA bit is clear. If the LMA bit is set and the L bit in the code segment is clear, then a compatibility operating mode is established by processor 10 and the D bit selects 16 bit or 32 bit mode. If the LMA bit and the L bit are set and the D bit is clear, 32/64 mode is selected for processor 10. Finally, the mode which would be selected if the LMA, L and D bits are all set is reserved.

As mentioned above, the 32/64 operating mode includes a default address size in excess of 32 bits (implementation dependent but up to 64 bits) and a default operand size of 32 bits. The default operand size of 32 bits may be overridden to 64 bits via a particular instruction's encoding. The default operand size of 32 bits is selected to minimize average instruction length (since overriding to 64 bits involves including an instruction prefix in the instruction encoding which may increase the instruction length) for programs in which 32 bits are sufficient for many of the data manipulations performed by the program. For such programs (which may be a substantial number of the programs currently in existence), moving to a 64 bit operand size may actually reduce the execution performance achieved by the program (i.e. increased execution time). In part, this reduction may be attributable to the doubling in size in memory of the data structures used by the program when 64 bit values are stored. If 32 bits is sufficient, these data structures would store 32 bit values, Thus, the number of bytes accessed when the data structure is accessed increases if 64 bit values are used where 32 bit values would be sufficient, and the increased memory bandwidth (and increased cache space occupied by each value) may cause increased execution time. Accordingly, 32 bits is selected as the default operand size and the default may be overridden via the encoding of a particular instruction. However, other embodiments may define the default operand size to be 64 bits when the default address size is 64 bits (or an implementation dependent size greater than 32 bits).

Data Reference Address Checking

As mentioned above, the address size in 32/64 mode is implementation dependent (any number of bits greater than 32, up to 64 bits). An example implementation having 48 bits is also mentioned. Thus, the processor 10 supports a maximum address space which varies from implementation to implementation. This maximum address space will be referred to below as the implemented address space, and may be any size in a given implementation.

As FIG. 4 illustrates, the processor 10 supports at least one operating mode in which memory references are performed in an unsegmented address space (e.g. the 32/64 mode) and at least one operating mode in which data references are performed in a segmented address space (e.g. the 16 and 32 bit compatibility modes, and the 16 and 32 bit legacy modes (in which the LMA bit is clear)). Accordingly, the types of checks that are performed on addresses of memory references may vary, depending on the operating mode (and the segment type, in some cases).

As mentioned above, the 32/64 mode largely does not employ segmentation. Accordingly, the address space in 32/64 mode may be viewed as an unsegmented address space. The CS segment is used to provide the operating mode indication (e.g. the L bit and the D bit) as well as a few other indications as illustrated in FIG. 2 for one embodiment. Additionally, some of the segment base addresses may be used, as described above with respect to FIG. 1, and table segments may still be subject to segment limit checks. The legacy modes may be viewed as modes in which a segmented address space is specified, and in which a transition to a mode having an unsegmented address space is not enabled (since the LMA bit is clear). The compatibility modes may be viewed as modes in which a segmented address space is specified, and in which a transition to a mode in which an unsegmented address space is enabled (since the LMA bit is set, enabling transition to 32/64 mode). Viewed in another way, the legacy modes may be modes in which a segmented address space is specified, and the linear address size is less than or equal to 32 bits. The compatibility modes may be modes in which a segmented address space is specified, and the linear address size in at least some segments (e.g. table segments) is greater than 32 bits.

Data reference address checking is described in more detail below. It is noted, however, that processor 10 may perform the described segment limit and canonical checks on other types of addresses (e.g. instruction references). Generally, a memory reference is an access to memory. A memory reference may be an instruction fetch (an "instruction reference") or may be a data reference. Data references may include any data requests. For example, data references may be for data to be operated upon in response to executing an instruction. Data references may also be for data from various architected memory data structures, such as segment descriptor data, task state segment data, etc.

Each segment in the segmented address space may have a defined limit (e.g. via -the limit field 57A–57B in segment descriptors similar to the segment descriptor shown in FIG. 3, or a limit field in a register such as the LDTR or GDTR). Accordingly, a segment limit check on the effective address of a data reference may be performed if the data reference is in a segmented address space. A segment limit check is a check to ensure that the effective address (which is an offset within a segment corresponding to the data reference) is within the limit for the segment for each byte of the data reference.

In operating modes in which the virtual address may be greater than 32 bits, the size of the implemented address space is implementation dependent. In order to ensure compatibility between implementations that employ different sized implemented address spaces, the processor 10 may enforce a canonical check on data reference addresses that occur in the implemented address space (i.e. that have an address size greater than 32 bits). A canonical check is a check to ensure for the virtual address of each byte of a data reference, that each non-implemented virtual address bit is equal to the most significant implemented address bit. For example, in a 48 bit implemented address space, an address in canonical form has bits 63:47 of the virtual address being equal.

Additionally, in some modes (for example, the compatibility modes), the table segments may be located anywhere in the implemented address space. The table segments are the segments storing the segment descriptor tables. In one embodiment compatible with the x86 architecture, the table segments may include the segments for the local and global descriptor tables (as indicated by the LDTR 30 and the GDTR 32, respectively) as well as the interrupt descriptor table (indicated by the interrupt descriptor table register, or IDTR, not shown) and the task state segment (indicated by the task register, or TR, not shown). These registers may be configured to store 64 bit addresses (in canonical form, based on the implemented address space), allowing an operating system operating in 32/64 mode to place the segment tables anywhere in the implemented address space. Thus, in 32/64 mode (and in the compatibility modes, since the processor accesses the segment tables in these modes), data references to table segments may be checked for canonical address form in addition to checking against the corresponding segment limit. User segments (those segments usable by the application programs) may not be checked for canonical address form since these addresses are limited to 32 bits in size. In embodiments compatible with the x86 architecture, user segments may include segments indicated by the segment registers 24.

As mentioned above, the implemented address space exceeds 32 bits. Thus, the processor 10 is capable of generating linear addresses (the addresses generated after segmentation has been taken into account but before any paging translation) in excess of 32 bits (e.g. 48 bits, in the exemplary embodiment described herein). In order to replicate the behavior for the compatibility and legacy modes (in which linear addresses are 32 bits and thus naturally truncated at 32 bits), the processor 10 may truncate linear addresses to 32 bits in these modes. However, the truncation may not be used for table segments in the compatibility modes, in order to allow access to the tables anywhere within the implemented address space. Additionally, a mechanism may be provided to override the truncation under program control (e.g. for performing memory sizing without having to enter 32/64 mode).

Figure 5:
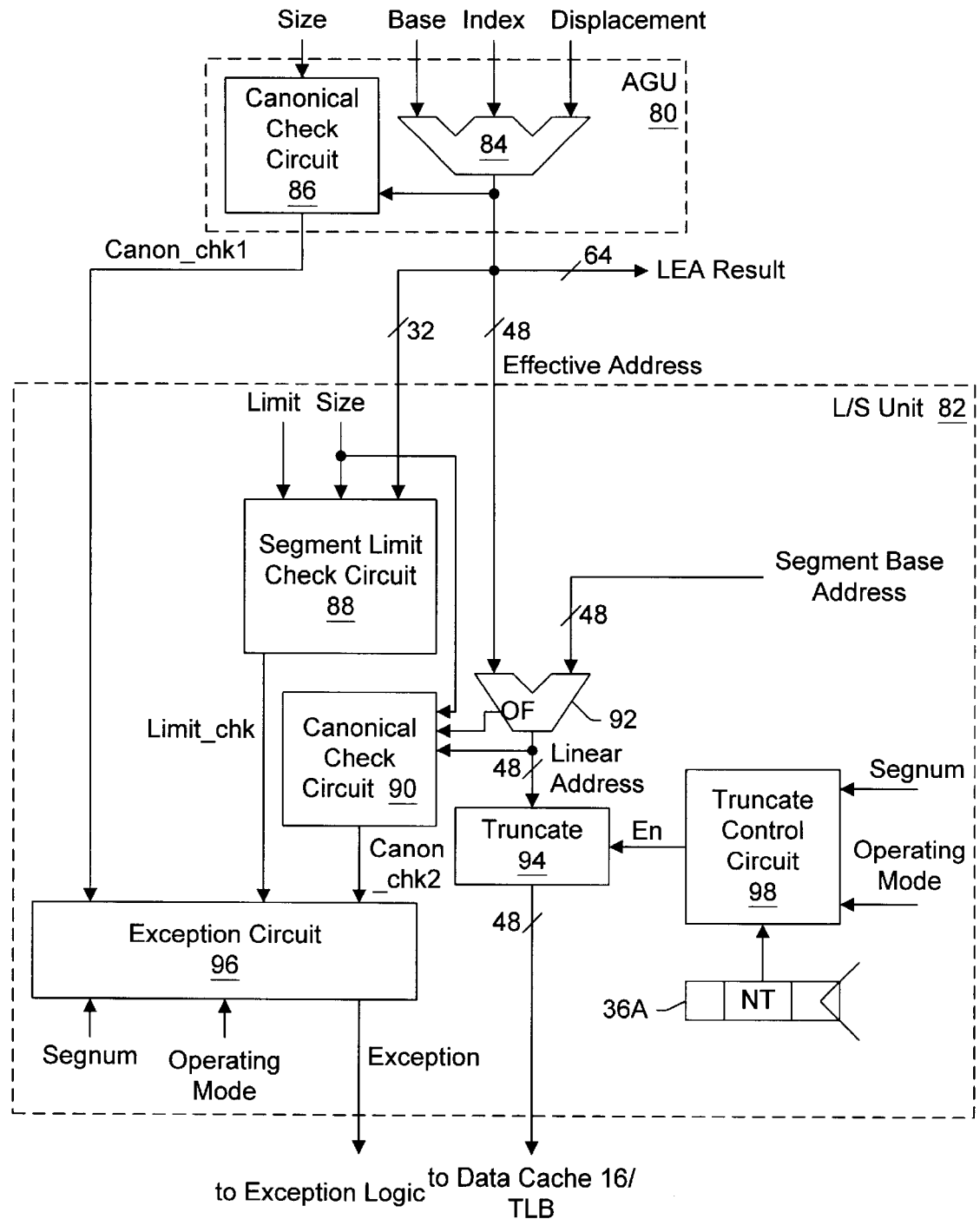
FIG. 5 is a block diagram of a portion of one embodiment of an execution core.

Turning now to FIG. 5, a block diagram of a portion of one embodiment of the execution core 14 is shown. Other embodiments are possible and contemplated. For the illustrated embodiment, an example in which the implemented address size is 48 bits is used. However, other embodiments may have any implemented address size.

In the embodiment of FIG. 5, an address generation unit (AGU) 80 and a load/store (L/S) unit 82 are shown. The AGU 80 includes an adder 84 and a canonical check circuit 86. The L/S unit includes a segment limit check circuit 88, a canonical check circuit 90, an adder 92, a truncate circuit 94, an exception circuit 96, a truncate control circuit 98, and an MSR 36A (which may be one of the MSRs 36 shown in FIG. 1).

The adder 84 is coupled to receive base, index, and displacement operands of a data reference and to provide an effective address output to the canonical check circuit 86, the segment limit check circuit 88, the adder 92, and as a result of a load effective address (LEA) instruction. The canonical check circuit 86 is coupled to receive a size of the data reference and to provide an output (Canon_chk1) to the exception circuit 96. The segment limit check circuit 88 is further coupled to receive the size of the data reference and the segment limit from the segment corresponding to the data reference, and to provide an output (Limit_chk) to the exception circuit 96. The canonical check circuit 90 is coupled to receive the size of the data reference, an overflow output from the adder 92, and the linear address output of the adder 92 and is coupled to provide an output (Canon_chk2) to the exception circuit 96. The adder 92 is further coupled to receive the segment base address for the segment corresponding to the data reference, and is further coupled to provide the linear address output to the truncate circuit 94. The truncate control circuit 98 is coupled to receive an indication of the segment corresponding to the data reference (Segnum) and an indication of the operating mode, and is coupled to provide an enable signal (En) to the truncate circuit 94. The truncate circuit 94 is coupled to provide an output to the data cache 16 (and optionally to a TLB, not shown). The exception circuit 96 is further coupled to receive the indication of the segment corresponding to the data reference (Segnum) and the indication of the operating mode, and is coupled to provide an exception indication to exception logic within the execution core 14.

Each of the canonical check circuits 86 and 90 are configured to perform canonical address checks on the addresses received by those circuits. Specifically, the canonical check circuit 86 receives the effective address of a data reference and the canonical check circuit 90 receives the linear address (and an indication of overflow from the adder 92). As mentioned above, a data reference address is in canonical form if, for the address of each byte of the data reference, the unimplemented address bits are equal to the most significant implemented address bit. The check may be satisfied by checking the address of the first byte and the last byte of the data reference. That is, the address is in canonical form if the address generated by the corresponding adder is in canonical form and if the sum of the address plus the size-1 is in canonical form.

In the case of the canonical check circuit 86, a 64 bit address is generated by the adder 84 for use as the LEA result (e.g. for writing into the register file 22). Accordingly, the 64 bit result may be checked for canonical form by the canonical check circuit 86. The result of the canonical check performed by the canonical check circuit 86 is transmitted as the Canon_chk1 output to the exception circuit 96. By performing the canonical check within the AGU 80 and transmitting the Canon_chk1 output to the exception circuit 96, the AGU 80 may not route the unimplemented effective address bits (e.g. the most significant 16 address bits, in the illustrated example) to the L/S unit 82. As illustrated in FIG. 5 for this embodiment, the least significant 48 bits are routed to the L/S unit 82. In embodiments in which the AGU 80 and the L/S unit 82 are not physically implemented near each other, savings in routing congestion may be realized.

In the case of the canonical check circuit 90, which performs the canonical check on the linear address formed from the sum of the effective address and the segment base for the segment corresponding to the data reference, only the implemented address bits are generated by the adder 92 (e.g. the adder 92 is a 48 bit adder for the illustrated embodiment). Since the effective address is checked for canonical form by the canonical check circuit 86 and since the segment base address is checked for canonical form when loaded into the corresponding segment register (or table segment base register such as the LDTR, etc.), canonical form may be checked in the canonical check circuit 90 by examining the overflow from the adder 92. That is, if an overflow occurs, the unimplemented bits of the result would have been a non-canonical value. Accordingly, if an overflow from the adder 92 occurs, then the linear address is not in canonical form. Furthermore, if an overflow is detected from adding the linear address and the size-1 by the canonical check circuit 90, the linear address is not in canonical form. The canonical check circuit 90 generates the Canon_chk2 output accordingly.

It is noted that, since the canonical check circuit 86 performs the canonical check on the effective address, if the segment base address is zero then the canonical check circuit 90 need not perform a check. Furthermore, in some embodiments, the adder 92 may be bypassed if the segment base address is zero. In such embodiments, the canonical check circuit 90 may qualify generation of the Canon_chk2 output with a check on whether or not the segment base address is zero, such that the Canon_chk2 does not indicate a canonical form exception if the segment base address is zero. Alternatively, the qualification may not be performed since, if the segment base address is zero, the Canon_chk2 input may not signal an exception unless the Canon_chk1 input is also signaling an exception.

The segment limit check circuit 88 performs a segment limit check, using the limit for the segment corresponding to the data reference, the effective address, and the size of the data reference. Specifically, since the processor 10 implements segmentation in the 32 bit and 16 bit modes (either legacy modes or compatibility modes) in which the address size is limited to 32 bits, the least significant 32 bits of the effective address are provided to the segment limit circuit 88. The least significant 32 bits of the effective address are also referred to as the offset portion of the logical address in the x86 architecture. The segment limit check circuit 88 checks that the offset of each byte of the data reference is within the segment limit, and outputs the result of the check (Limit_chk). Similar to the canonical check above, the segment limit check may be performed on the first and last byte of the data reference. That is, the segment limit check circuit may check that the logical address is within the limit and the logical address plus the size-1 is within the limit.

In one embodiment (corresponding to the example circuit shown in FIG. 7), each of the Canon_chk1, Canon_chk2, and Limit_chk outputs may be a signal indicative of an exception result when in a logical one state and no exception when in a logical zero state. The exception output of the exception circuit 96 may be a signal with a similar definition. Other embodiments may use signals indicative of no exception when in a logical one state and an exception when in a logical zero state. Still further, any indication may be used in other embodiments.

The exception circuit 96 is configured to select which of the Canon_chk1, Canon_chk2, and Limit_chk inputs may cause the exception output to indicate an exception, based on the operating mode and on the segment corresponding to the data reference. If an exception is indicated, the exception logic within the execution core 14 causes an exception on the instruction which sourced the data reference (either directly, as a load or store operation explicit or implicit in the instruction, or indirectly, as a paging table access, segment table access, etc.). The execution core 14 may be redirected to an exception handler code sequence to handle the exception.

In one embodiment, the exception circuit 96 may use the following rules for selecting canonical check results and the segment limit check result for generating the exception output: (i) if the operating mode is one of the legacy modes or the compatibility modes, the limit check is selected; (ii) if the operating mode is 32/64 and the segment corresponding to the data reference is a table segment, the limit check is selected; (iii) if the operating mode is one of the compatibility modes and the segment is a table segment, the Canon_chk2 input is selected; (iv) if the operating mode is 32/64 the Canon_chk2 input is selected; and (v) if the operating mode is 32/64 and the segment is a user segment, the Canon_chk1 input is selected.

The following pseudocode may encode the above rules:
```
If (Legacy Mode)
    Exception=Limit_chk
Else
    If (Compatibility Mode)
        If (User Segment)
            Exception=Limit_chk
        Else/*Table Segment*/
            Exception=Limit_chk||Canom_chk2
    Else/*32/64 mode*/
        If (User Segment)
            Exception=Canon_chk1||Canon_chk2
        Else/*Table Segment*/
            Exception=Limit_chk||Canon_chk2
```

In one embodiment, the processor 10 uses microcode to perform table segment accesses. The microcode may be programmed such that displacements used in the table segment routines do not generate non-canonical effective addresses, allowing for the Canon_chk1 input to be non-selected for table segments in 32/64 mode and the compatibility modes. In other embodiments, the Canon_chk1 input may be selected for the table segments in both 32/64 mode and the compatibility modes.

As used herein, an input is selected by the exception circuit 96 if the input is permitted, if indicative of an exception, to cause the output of the exception circuit 96 to indicate the exception. The input is not selected if that input is prevented from causing the exception.

A segment "corresponds" to a data reference if the segment is the segment specified for that data reference by the source of that data reference (e.g. an instruction or a microcode routine used to access a table segment). Furthermore, the term effective address refers to the address generated from the address operands of an instruction, excluding the affects of any virtual address mechanisms such as segmentation or paging.

It is noted that, while the canonical check circuits 86 and 90 are illustrated separate from their corresponding adders 84 and 92, the canonical check circuits may be integrated into the respective adders in other embodiments.

Figure 7:
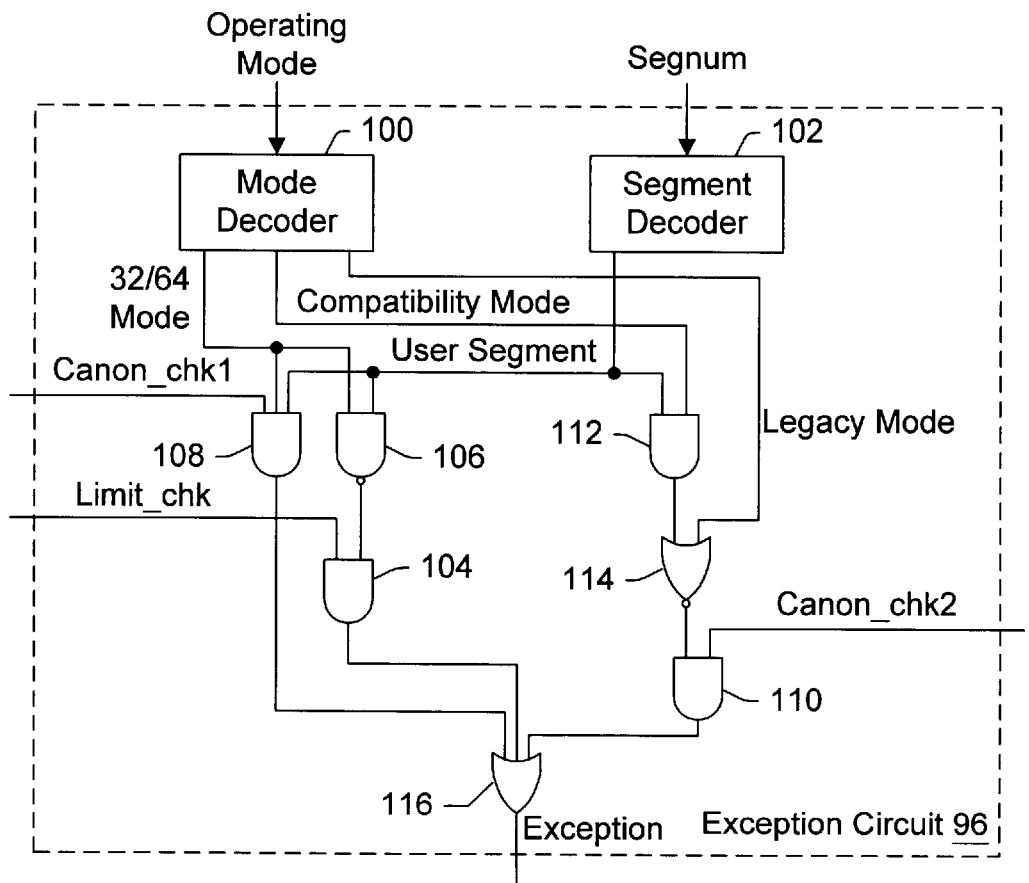
FIG. 7 is a circuit diagram of one embodiment of an exception circuit shown in FIG. 5

FIG. 7 is a circuit diagram of one embodiment of the exception circuit 96. Other embodiments are possible and contemplated. In the embodiment of FIG. 7, a mode decoder 100 is coupled to receive the operating mode indication and to decode the operating mode indication into signals indicating legacy mode, compatibility mode, and 32/64 mode. The operating mode indication may be any indication, including the values shown in FIG. 4 or an encoded value indicating the various modes. Furthermore, the operating mode indication may include signals indicating legacy mode, compatibility mode, or legacy mode and thus the mode decoder 100 may be eliminated. The Segnum indication may be provided to a segment decoder 102 which determines whether or not the segment indicated by the Segnum is a user segment. Other embodiments may receive a user segment signal directly.

The outputs of the segment decoder 102 and the mode decoder 100 are provided to combinatorial logic circuits to generate the exception output signal for the exception circuit 96. Specifically, the Limit_chk signal is selected (AND gate 104) unless the operating mode is 32/64 and the segment is a user segment (NAND gate 106). The Canon_chk1 signal is selected if the operating mode is 32/64 and the segment is a user segment (AND gate 108). The Canom_chk2 signal is selected (AND gate 110) unless the operating mode is legacy mode or the operating mode is compatibility mode and the segment is a user segment (AND gate 112 and NOR gate 114). The selected signals are combined (OR gate 116) to generate the Exception signal.

The embodiment of FIG. 7 is merely exemplary. Other embodiments, including all Boolean equivalents of the embodiment of FIG. 7, may be used. Furthermore, other embodiments are contemplated in which the signals are defined to indicate exception at different logic levels, etc.

Returning to FIG. 5, the truncate control circuit 98 is configured to cause the truncate circuit 94 to truncate the linear address from the implemented address size to 32 bits dependent of the operating mode and segment. For example, in either the legacy modes or in user segments in the compatibility modes, the truncate control circuit 98 may cause the truncate circuit 94 to truncate the address. In either 32/64 mode or in table segments in the compatibility modes, the truncate control circuit 98 may cause the truncate circuit 94 not to truncate the address. Generally, the truncate circuit 94 is a circuit which is configured to substitute binary zeros for a predefined number of most significant bits of an input address, and to pass the remaining bits through unmodified.

It is noted that, in the present embodiment, the Canon_chk2 signal and the enabling of truncation are mutually exclusive.

Additionally, for the illustrated embodiment, the truncate control circuit 98 is coupled to receive an indication from the MSR 36A (e.g. the NT bit, in the illustrated embodiment). The NT bit may be used to force the truncate control circuit 98 not to cause truncation, even if the operating mode and segment would otherwise indicate truncation.

The NT bit may be used in a variety of fashions. For example, during boot of a computer system including the processor 10, a software routine is typically executed to determine the size of the memory installed in the computer system. Generally, the routine may program a base address for a particular bank of memory and then attempt to read memory locations at various addresses offset from the base address. If an error is detected, no memory is installed at that address and the size of the memory bank is determined. Alternatively, the routine may write various addresses offset from the base address with a predetermined value, read back the same addresses, and check that the value read is the same as the value written to detect the existence or absence of memory at the various addresses. Once the size of a given memory bank is determined, the routine may then program the base address of the next memory bank to the sum of the base address and the size of the previous memory bank, and continue testing with addresses above the new base address. Generally, this memory sizing routine is executed before the paging mechanism is configured and enabled. Accordingly, testing memory in excess of 4GB (the amount of memory addressable with 32 bits of address) would be difficult since addresses are 32 bits.

Figure 8:
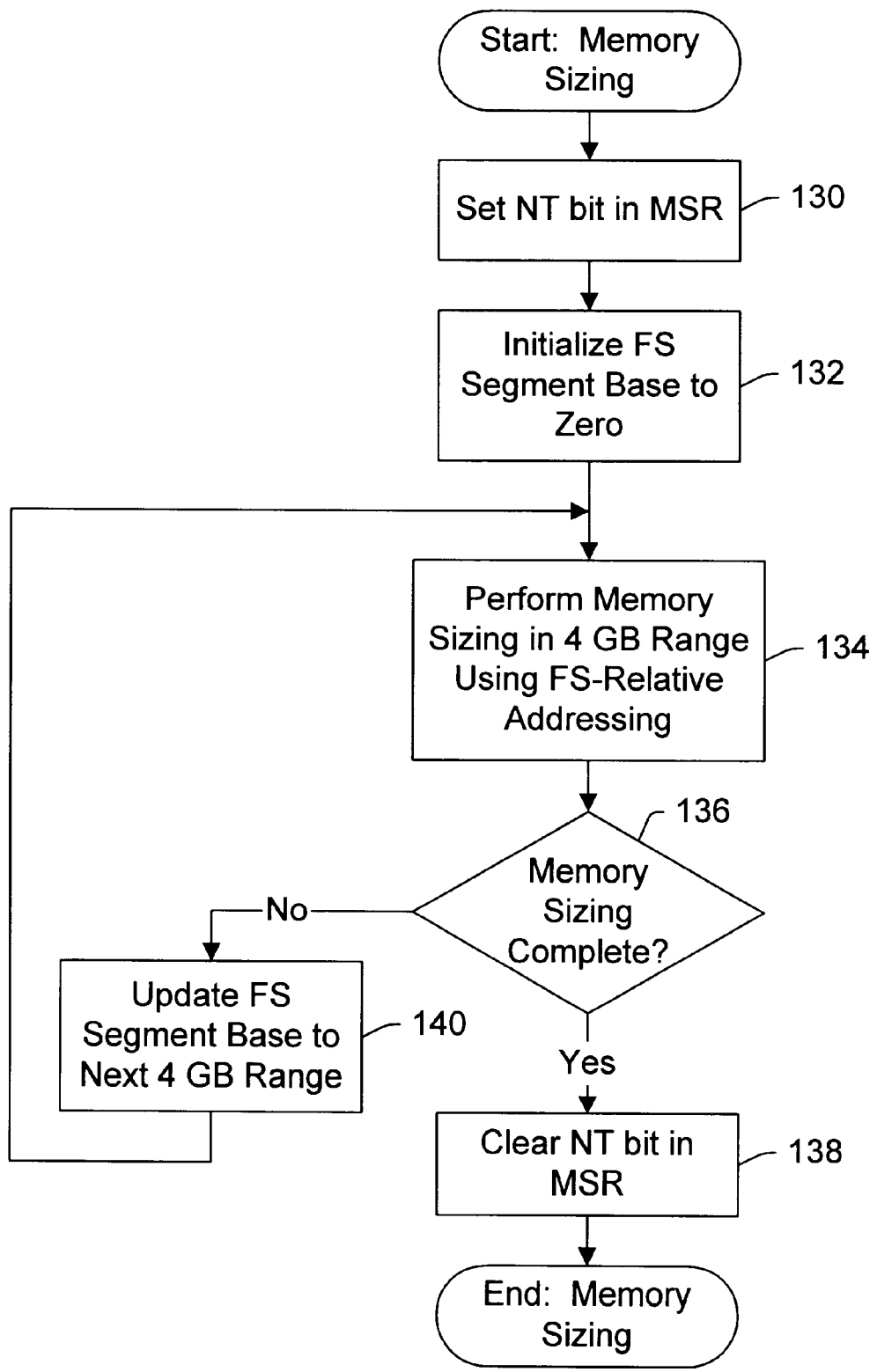
FIG. 8 is a flowchart illustrating one embodiment of a memory sizing code sequence.

As mentioned above with respect to FIG. 1, one or more of the data segment registers may be used as a source of a segment base address in 32/64 mode (e.g. the FS and GS segment registers). Thus, the segment base address portion of these registers are expanded to the implemented address size (e.g. 48 bits). By programming one of the segment base addresses to a 4GB boundary and performing memory references relative to that segment, addressing above 4GB may be achieved. Additionally, by setting the NT bit in the MSR 36A, the truncation of the addresses by the truncate circuit 94 may be inhibited. A flowchart illustrating one embodiment of memory testing using the NT bit and the segment base addresses is shown in FIG. 8.

It is noted that, while an MSR is used in the present example to store the NT bit, any other register (e.g. a special purpose register) may be used.

Figure 6:
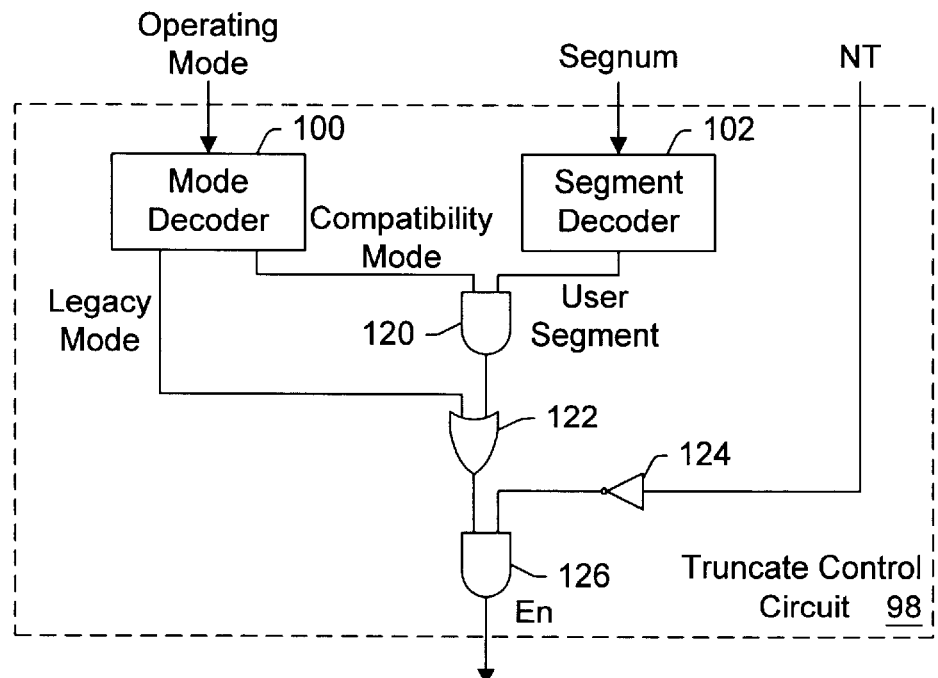
FIG. 6 is a circuit diagram of one embodiment of a truncate control circuit shown in FIG. 5.

FIG. 6 is a circuit diagram of one embodiment of the truncate control circuit 98. Other embodiments are possible and contemplated. In the illustrated embodiment, the truncate control circuit 98 includes the mode decoder 100 and the segment decoder 102, similar to the like numbered decoders mentioned above with respect to FIG. 7 (and the decoders may be eliminated in a manner similar to the description above for FIG. 7). The mode decoder 100 provides a legacy mode signal and a compatibility mode signal, and the segment decoder 102 provides a user segment signal. The truncate control circuit 98 causes truncation (by asserting the output En signal) if the operating mode is compatibility mode and the segment is a user segment (AND gate 120) or if the operating mode is legacy mode (OR gate 122). The truncation may be overridden if the NT bit is set (inverter 124 and AND gate 126).

The embodiment of FIG. 6 is merely exemplary. Other embodiments, including all Boolean equivalents of the embodiment of FIG. 6, may be used. Furthermore, other embodiments are contemplated in which the signals are defined to be asserted at different logic levels, etc.

It is noted that the portion of the execution core 14 shown in FIG. 5 may be pipelined as desired. For example, the AGU 80 may operate in one pipeline stage and the L/S unit 82 may operate in another pipeline stage. Furthermore, queuing may be introduced at any point. For example, queuing may be included between the adder 84 and the adder 92, or between the adder 92 and the data cache 16. Still further, while one AGU 80 and one L/S unit 82 are shown, other embodiments may include two or more of either AGU 80 or L/S unit 82, or two or more of both units.

It is noted that the base, index, displacement, size, segment limit, segment base address, and segment indication (Segnum) may be provided to the AGU 80 and/or the L/S unit 82 by other circuitry within the execution core 14 or the processor 10 during the processing of an instruction which causes a data reference. The segment limit and the segment base address may be read from the segment register (or table segment register) corresponding to the data reference. In one embodiment, the segment base addresses (or even all of the segment registers and table registers) may be included in the L/S unit 82. In other embodiments, these registers may be located elsewhere within the processor 10. The base, index and displacement may be address operands from the instruction, and one or more of the operands may be zero if not used in a given instruction. The size and the segment indication may be decoded from the instruction.

It is noted that, while the x86 architecture and an architecture which is compatible with the x86 architecture and includes additional features for 64 bit processing is used herein, other embodiments may employ any architecture which has at least one operating mode in which the address space is segmented and at least one other operating mode in which the address space is unsegmented.

Turning next to FIG. 8, a flowchart is shown illustrating operation of one embodiment of a code sequence for performing memory sizing. Other embodiments are possible and contemplated. Generally, the code sequence may comprise a plurality of instructions which, when executed, perform the blocks illustrated in FIG. 8. While the blocks are shown in a particular order for ease of understanding, any order may be used.

The code sequence sets the NT bit in the MSR 36A, to prevent truncation of addresses during the memory sizing sequence (block 130). Additionally, the code sequence initializes the FS segment base address to zero (block 132). It is noted that the setting of the NT bit and the initializing of the FS segment base address may occur in either order. Also, initializing the segment base address to zero may be eliminated if the segment base address is known to be zero (e.g. via reset or some earlier code).

The code sequence performs memory sizing within the 4GB address range beginning at the segment base address in FS (block 134). The memory references used in the block 134 are FS-relative. In other words, the instructions which cause the memory references specify the FS segment. In the x86 architecture, such a specification may be accomplished using a segment override prefix on the instruction.

If memory sizing is complete (decision block 136), the code sequence clears the NT bit in the MSR 36A (block 138) and the memory sizing routine is finished. Memory sizing may be complete if all memory banks have been configured. If memory sizing is not complete but is complete within the current 4GB range, the code sequence updates the FS segment base address to indicate the next consecutive 4GB range (block 140), and block 134 is reexecuted within the newly established 4GB range.

In one embodiment, the updates to the FS segment base address in blocks 132 and 140 may be performed using writes to an MSR mapped to the FS segment base address portion of the FS segment register. While the FS segment base address is used in this embodiment, any segment base address may be used in other embodiments. In the 32 bit mode in which the code sequence may be operating, the write to the MSR uses the contents of both the EAX and EDX registers to provide the 64 bit value for the write to the MSR, with the EDX register being the more significant 32 bits. Thus, the code sequence may create the address for the FS segment base by appropriate mathematical operations on the EDX register. The EAX register may be set to zero, thus aligning the address in the FS segment base to a 4GB boundary.

Figure 9:
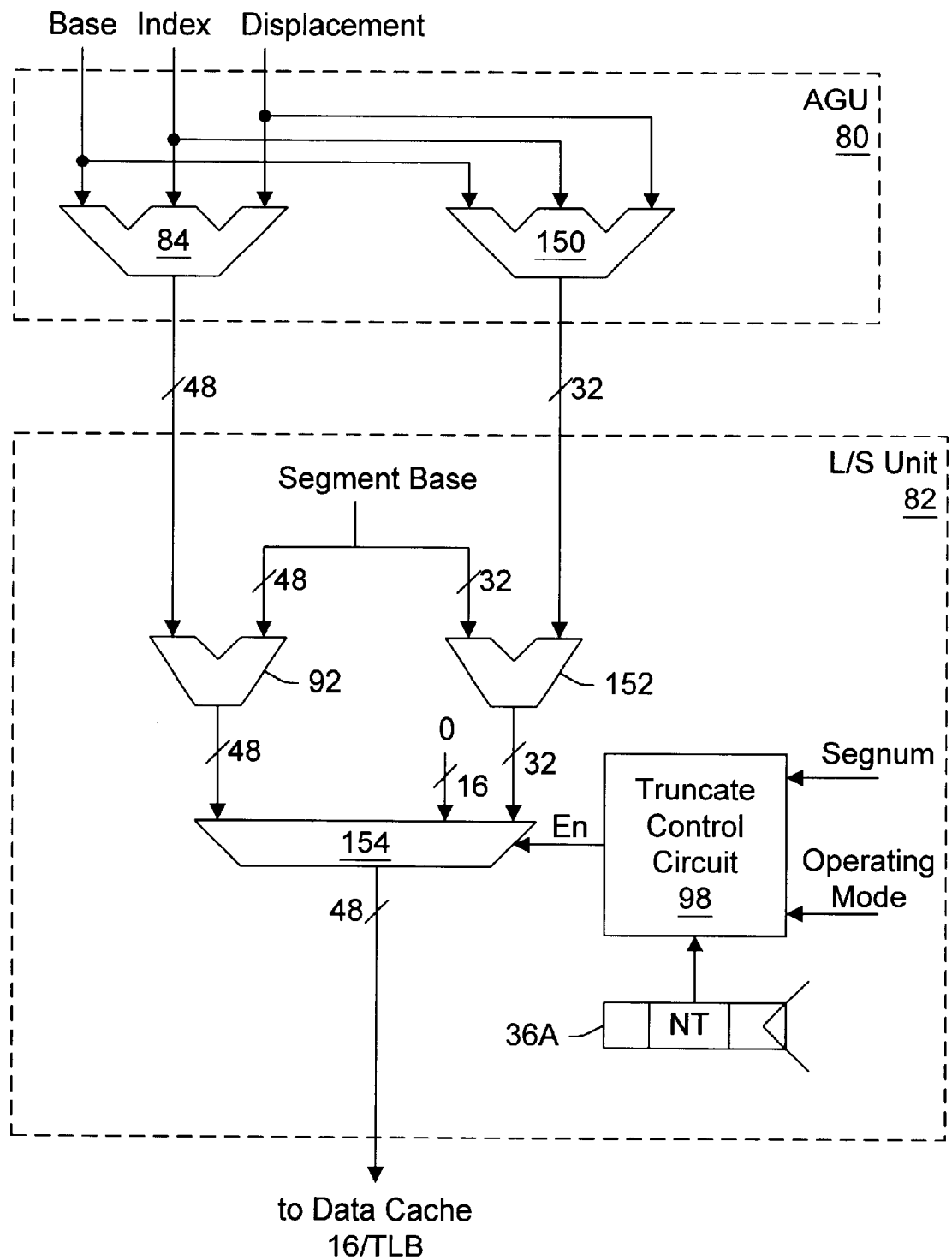
FIG. 9 is a block diagram of a portion of a second embodiment of an execution core.

Turning now to FIG. 9, a block diagram of a portion of a second embodiment of the AGU 80 and the L/S unit 82 is shown. In the embodiment of FIG. 9, the AGU 80 includes parallel adders 84 and 150, and the L/S unit 82 may have parallel adders 92 and 152. The adders 84 and 92 may be configured as in the embodiment of FIG. 5 (e.g. the adder 84 may be a 64 bit adder and the adder 92 may be a 48 bit adder, and the adders may be coupled to canonical check circuits as shown in FIG. 5). The adders 150 and 152 may be 32 bit adders which may be used to generate addresses naturally truncated to 32 bits. The adders 150 and 152 receive the least significant 32 bits of the operands (base, index, and displacement for the adder 150 and the segment base address for the adder 152). Instead of a truncate circuit, a multiplexor (mux) 154 is provided which receives, as inputs, the outputs of adders 92 and 152. Additionally, the input of the mux 154 to which adder 152 is coupled is coupled to a set of binary zeros for the most significant bits of the output address. The output of the truncate control circuit 98 may be used to select either the output of adder 92 (no truncation) or the output of adder 152 (truncation), depending on the operating mode, the segment, and the state of the NT bit from the MSR 36A.

Software Embodiments

While the above description may generally have described a processor which may directly support, in hardware, the processor architecture having the features described above, it is contemplated that other processor embodiments may not directly implement the processor architecture. Instead, such embodiments may directly implement a different processor architecture (referred to below as a native processor architecture, which may define a native instruction set including native instructions). Any native processor architecture may be used. For example, the MIPS, Power PC, Alpha, Sparc, ARM, etc. architectures may be used. The processor architecture may be implemented in software executing on the native processor architecture in a variety of fashions, using any native processor architecture such as, for example, the Crusoe products of Transmeta Corporation.

Generally, a processor embodiment implementing a native processor architecture different than the processor architecture described above (referred to below as the non-native processor architecture) may support the non-native processor architecture in a variety of fashions. For example, such a processor embodiment may execute interpreter software which reads each non-native instruction in a non-native code sequence as data, and executes various software routines which emulate the defined operation of the non-native instruction as defined in the non-native processor architecture. Alternatively, translator software may be executed. The translator software may translate the non-native instructions in the code sequence to an equivalent set of native instructions defined by the native instruction set architecture. The native code sequence may be stored in memory, and may be executed instead of the corresponding non-native code sequence. In yet another alternative, a mixture of interpretation and translation may be used. For example, the code sequence may be interpreted, but the interpreter may also generate statistics about which parts of the code sequence are being most frequently executed. The most frequently executed portions may then be translated to native code sequences.

In any of the above methods, the architected state defined by the non-native processor architecture may be maintained by the combination of the processor and the software (interpreter or translator) in a variety of fashions. For example, the non-native architected state may be mapped to memory locations in a memory addressable by the processor, to general registers defined by the native processor architecture (by software convention, either in the interpreter or in the translator), or the processor may directly support the non-native architected state by defining registers or other storage hardware within the processor that corresponds to the non-native architected state. The non-native architected state may be stored using any combination of the above methods, as desired.

Generally, the architected state includes any state defined to exist by the architecture. For example, in the above described embodiment, the non-native architected state may include general registers (e.g. RAX, RBX, etc.), segment registers, control registers, other registers such as the model specific registers (MSRs), etc. Additionally, the architected state may include data structures defined for the operating system to create, such as the descriptor tables, page tables, task state segments, etc.

Figure 10:
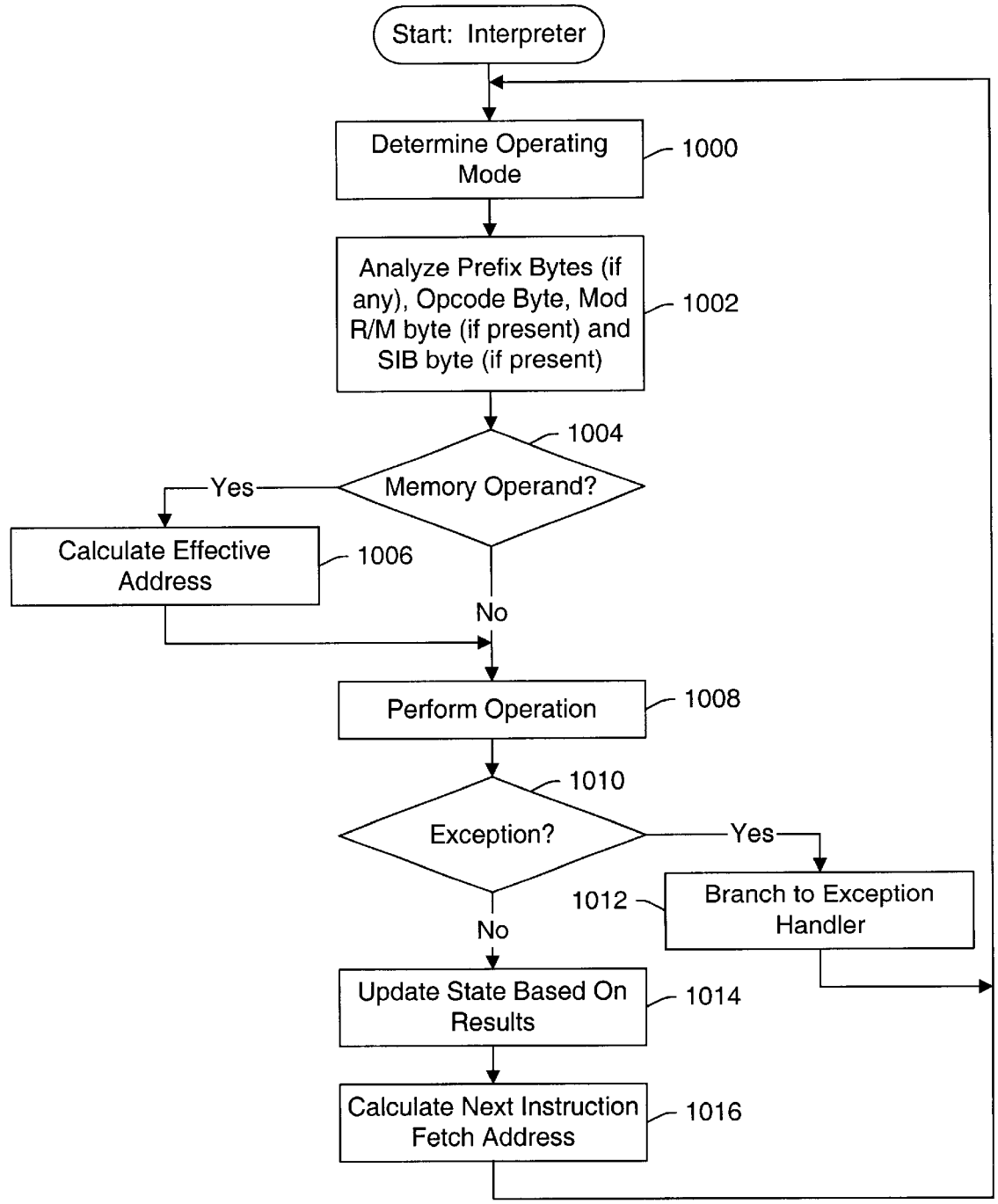
FIG. 10 is a flowchart illustrating one embodiment of an interpreter.

Turning to FIG. 10, a flowchart illustrating an exemplary interpreter which may be used to interpret non-native instructions is shown. Other embodiments are possible and contemplated. While the blocks shown are illustrated in a particular order for ease of understanding, any suitable order may be used. Furthermore, blocks may be performed in parallel, as desired.

The blocks shown in FIG. 10 illustrate the emulation of one non-native instruction. Generally, the interpreter may execute the blocks shown in FIG. 10 for each non-native instruction to be executed according to the non-native code sequence to be executed.

The interpreter may determine the operating mode for the non-native instruction (block 1000). As described above, the operating mode may be determined from the LMA bit in control register 26 and the L bit and D bit from the code segment descriptor indicated by the CS segment register. The operating mode may be determined anew from the LMA, L bit, and D bit for each non-native instruction, or the resulting operating mode may be stored in a temporary register for access by the interpreter for each non-native instruction. If the resulting operating mode is stored, the interpreter may update the stored operating mode if an instruction modifies the CS segment register or interrupt or exception handling causes the operating mode to change. As mentioned above, the CS segment register and the control register(s) (which are part of the non-native architected state) may actually be memory locations, general registers, or special purpose registers, or any combination thereof.

The interpreter may read the current non-native instruction from memory, and may analyze the non-native instruction to determine the operations to be taken to emulate the non-native instruction (block 1002). The interpreter may read the non-native instruction one byte at a time, or may read a suitable set of consecutive bytes and process the bytes. For example, a native processor architecture in which operands are 32 bit may read 32 bits (4 bytes) of the non-native instruction at a time, and then may process the four bytes before reading any additional bytes.

Generally, the interpreter software may decode the non-native instruction in a manner analogous to processor 10 decoding the instruction in hardware. Thus, for the illustrated non-native processor architecture, which is compatible with the x86 processor architecture, the analyzing of the non-native instruction includes analyzing any prefix bytes which may precede the opcode byte, analyzing the opcode byte, analyzing the addressing mode (Mod R/M) byte (if present), and analyzing the scale-index-base (SIB) byte (if present). Prefix bytes may override the operating mode, and may also include register specifier bits (e.g. the REX prefix byte). The opcode byte specifies the operation to be performed, and in some cases may include a register specifier or may implicitly specify an operand (e.g. the stack or the stack pointer). The Mod R/M byte specifies operands (including any displacement operands which may follow the Mod RIM byte or the SIB byte, if the SIB byte is present) and may include register specifiers. Finally, the SIB byte may include register specifiers. From the information gained from analyzing the non-native instruction, the interpreter has the information to emulate the non-native instruction (including operating mode for the non-native instruction, which specifies the operand size and address size of the non-native instruction, operands, the operation to be performed, etc.).

If the non-native instruction includes a memory operand (decision block 1004), the interpreter may calculate the effective address of the instruction (block 1006). If the non-native instruction has a memory operand, some of the operands identified in block 1002 may be address operands used to generate the effective address. Thus, the interpreter may read the address operands from the non-native architected state and may add them to generate an effective address. The size of the effective address may be determined by the address size for the instruction, as determined at blocks 1000 and 1002. It is noted that the native processor architecture may support an address size which is less than the address size supported by the non-native processor architecture. For example, in one exemplary embodiment described above, the virtual address size may be 48 bits in 32/64 mode. The native processor may, for example, support a virtual address size of 32 bits. In such an embodiment, block 1006 may represent a series of calculations in which the least significant bits (e.g. 32 bits) of the virtual address may be calculated, and any carry from the least significant bits may be carried into a calculation of the most significant bits of the virtual address.

The interpreter may then perform the operation specified by the non-native instruction (block 1008). If the non-native instruction includes a memory operand as a source operand, the interpreter may read the memory operand from the effective address calculated at block 1006. Other operands may be read from the non-native architected state. The operation may include an arithmetic operation, a logical operation, a shift, a move to another storage location, etc. The native processor architecture may support an operand size smaller than the operand size of the instruction. In such cases, performing the operation may include multiple calculations on portions of the operand to calculate the result.

The interpreter determines if the non-native instruction resulted in an exception (decision block 1010). Generally, exceptions may occur throughout the execution of the operations specified by the non-native instruction. For example, accessing a source memory operand may result in a page fault before any of the actual instruction operation is performed. During the operations, various architecturally-defined exceptions may also occur. The interpreter may interrupt processing of the non-native instruction upon detecting an exception, and may branch to exception handler instructions (block 1012). The exception handler may be native code or non-native code or a combination thereof, as desired. If the non-native processor architecture specifies the update of any architected state when an exception is taken (e.g. various control registers may store the address of the exception causing instruction, the exception reason, etc.), the interpreter may update the non-native architected state as defined.

It is noted that the interpreter software is executing on the native processor, and thus is subject to experiencing exceptions as defined in the native processor architecture. These exceptions may generally be different from the exceptions detected by the interpreter software, which are exceptions experienced by the non-native code being interpreted according to the non-native processor architecture.

If no exception occurs during emulation of the non-native instruction, the interpreter may update the non-native architected state according to the definition of the non-native instruction (block 1014). Finally, the interpreter may calculate the next non-native instruction fetch address to fetch the next instruction (block 1016). The next fetch address may be sequential to the current non-native instruction, or may be a different address (e.g. if the current non-native instruction is a taken branch, the next fetch address may be the target address of the branch instruction).

It is noted that the interpreter may operate in protected mode, using virtual addresses. In other words, the effective address calculated at block 1006 may be a virtual address which is translated by the translation mechanism specified by the non-native processor architecture to a physical address. The processor may include a translation lookaside buffer (TLB) used to cache translations. The processor may either support reload of the TLB from the non-native translation tables (page tables), or may take an exception on a TLB miss to allow software reload of the TLB.

Generally, the interpreter may perform the address checking and truncation described above with respect to FIGS. 5–9 at any point within the flowchart of FIG. 10. For example, the address checking and truncation may be performed within blocks 1004, 1006, and 1010.

Figure 11:
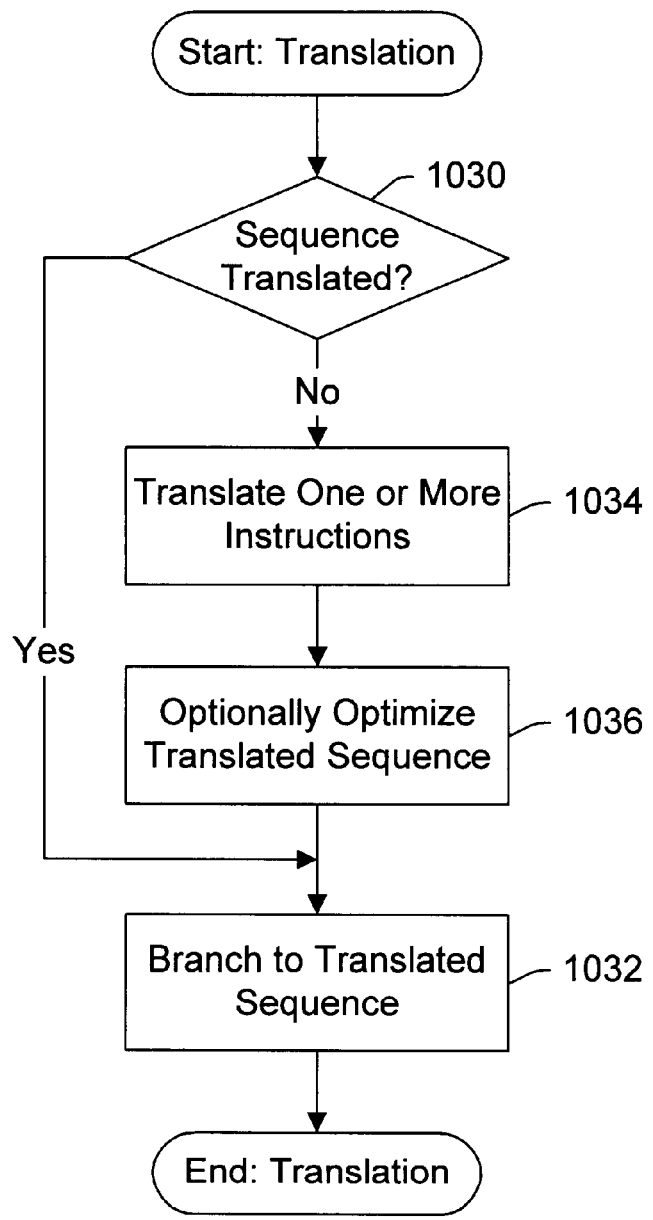
FIG. 11 is a flowchart illustrating one embodiment of a translator.

Turning to FIG. 11, a flowchart illustrating an exemplary translator which may be used to translate non-native instructions in the non-native processor architecture to native instructions in the native processor architecture. Other embodiments are possible and contemplated. While the blocks shown are illustrated in a particular order for ease of understanding, any suitable order may be used. Furthermore, blocks may be performed in parallel, as desired.

The blocks shown in FIG. 11 illustrate the translation of one non-native code sequence responsive to a fetch address for the first instruction in the non-native code sequence. The code translator may translate any number of non-native instructions to produce a translated code sequence having native instructions. For example, the translator may translate from the initial non-native instruction to a basic block boundary (i.e. a branch instruction). Alternatively, the translator may speculatively translate two or more basic blocks or may translate up to a maximum number of non-native or resulting native instructions, if desired.

Generally, the translator may maintain a translation cache which stores translated code sequences previously produced by the translator. The translation cache may identify translated code sequences by the fetch address of the first non-native instruction in the corresponding non-native code sequences. Thus, the translator may determine if a translated code sequence corresponding to the fetch address is stored in the translation cache (decision block 1030). If there is a translated code sequence in the translation cache, the translator may cause the processor to branch to that translated code sequence (block 1032). On the other hand, if there is no translated code sequence, the translator may translate one or more non-native instructions from the non-native code sequence into native instructions in a translated code sequence (block 1034).

Generally, the translator may translate each non-native instruction into one or more native instructions which, when executed, may perform the same operation on the non-native architected state that the non-native instruction would have performed. The translator may generally perform the same decoding of instructions as is performed by the interpreter (block 1002 in FIG. 10) to determine what operations may need to be performed. For example, if the native processor architecture is a load/store architecture in which memory operands are accessed using explicit load/store instructions and other instruction use only register operands, load and store instructions may be used to access the memory operands and other instructions may be used to perform the explicit operation of a non-native instruction having a memory operand. The translated instructions may make use of temporary registers to hold intermediate values corresponding to the execution of the non-native instruction. Additionally, the translated instructions may access the non-native architected state to retrieve operands and may update the non-native architected state with the final results of the non-native instruction. Generally, the native instructions corresponding to the non-native instruction may perform all of the operations defined for the instruction (e.g. blocks 1006, 1008, 1010, 1014, and 1016 in FIG. 10).

Once the translator has determined to terminate translation and save the translated sequence for execution, the translator may optionally optimize the translated code sequence (block 1036). The optimizations may include reordering the translated instructions for quicker execution, eliminating redundancies (e.g. redundant memory references, which may occur if multiple non-native instructions in the source code sequence accessed the same memory location), etc. Any suitable set of optimizations may be used. The resulting translated code sequence may then be stored into the translation cache. Additionally, the processor may branch to the translated code sequence and execute the sequence (block 1032).

It is noted that, while the above description may refer to accessing and/or updating non-native architected state, including various registers, the non-native architected state may be stored in any suitable fashion. For example, architected registers may actually be stored in memory locations, as highlighted above. The mapping of architected registers from the non-native processor architecture to memory locations may be used in either of the interpreter or the translator embodiments, or combinations thereof, to locate the non-architected state used during execution of the non-native instruction or affected by the execution of the non-native instruction. Thus, instructions which access the non-native architected state may perform memory reads/writes or register reads/writes, as the case may be.

Figure 12:
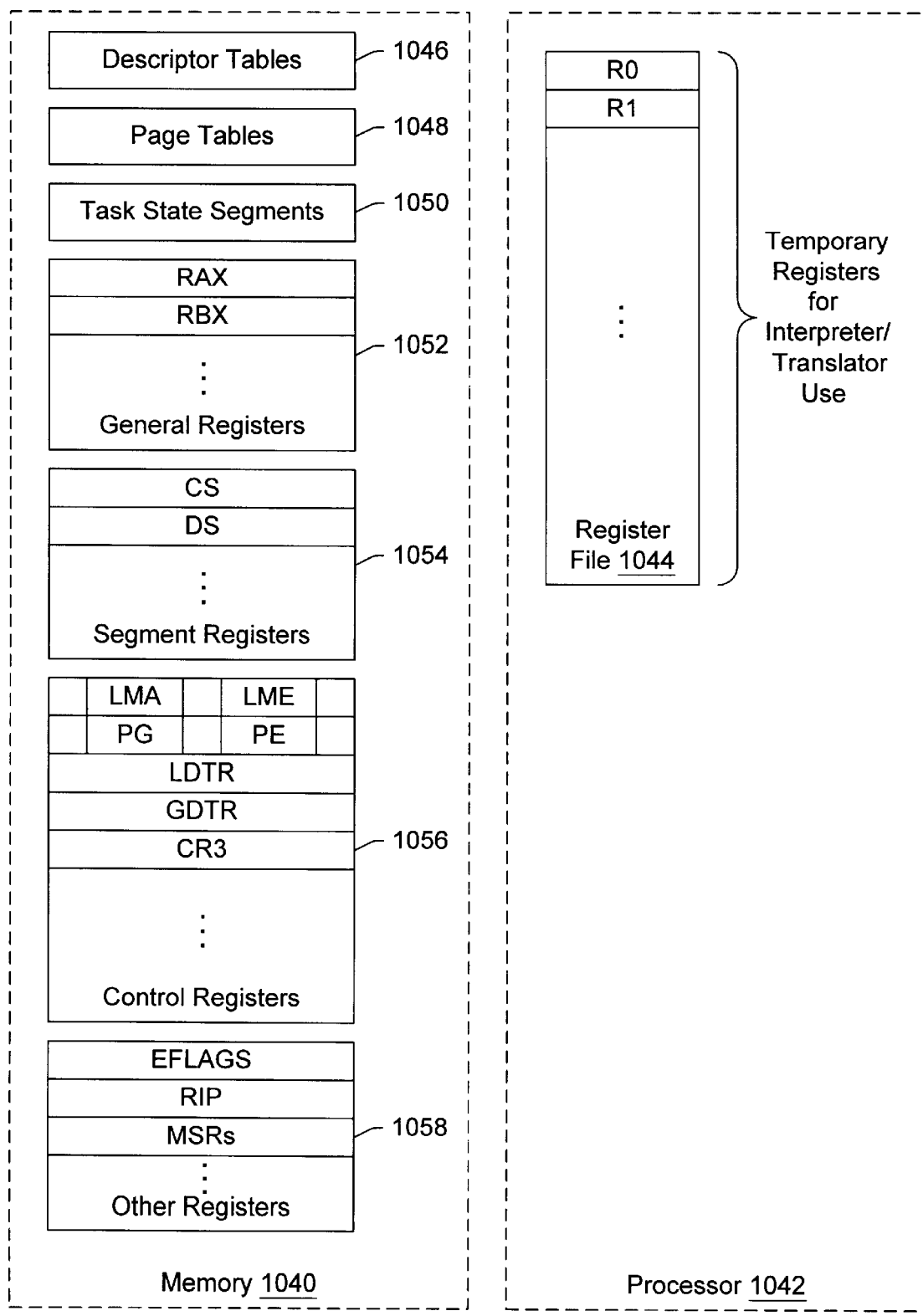
FIG. 12 is a block diagram illustrating one embodiment of mapping non-native architected state.

Turning next to FIG. 12, a block diagram illustrating one exemplary mapping of non-native architected state to either memory locations in a memory 1040 or to processor resources in a native processor 1042. Native processor 1042 includes a register file 1044 including the architected general registers of the native processor architecture. Any number of registers may be provided.

In the embodiment of FIG. 12, all of the non-native architected state is mapped to memory 1040. For example, descriptor tables 1046 (which may include a global descriptor table, a local descriptor table, and an interrupt descriptor table), page tables 1048 (which store virtual to physical address translations), task state segments 1050, general registers 1052, segment registers 1054, control registers 1056, and other registers 1058 may represent non-native architected state.

Thus, in the embodiment of FIG. 12, to access any non-native architected state, a memory access may be performed. For example, if a non-native instruction has one of the general registers as an operand, the interpreter or translated native instruction performs a memory access to the memory location mapped to that general register to access or update that general register. The registers in register file 1044 may be used by the interpreter or translator as temporary registers to hold intermediate results or for other local interpreter/translator state.

General registers 1052 may include integer general registers (e.g. RAX, RBX, etc. as described above), the additional integer general registers defined by the REX prefix byte, floating point registers, Streaming Single Instruction, Multiple Data (SIMD) Extension (SSE) registers, and the additional SSE registers defined by the REX prefix byte.

Segment registers 1054 may include storage locations corresponding to the segment registers 24 shown in FIG. 1 above.

Control registers 1056 may include storage locations corresponding to various control registers defined in the non-native processor architecture. For example, control registers storing the LMA, LME, PG and PE bits, as well as the LDTR and GDTR registers and the CR3 register (which stores the base address of the page tables 1048) are shown. Other control registers may be included as well.

Other registers 1058 includes any remaining architected registers. For example, the EFLAGS register, the instruction pointer (RIP) register (which stores the address of the instruction to be executed), and the model specific registers (MSRs) may be included in other registers 1058.

Figure 13:
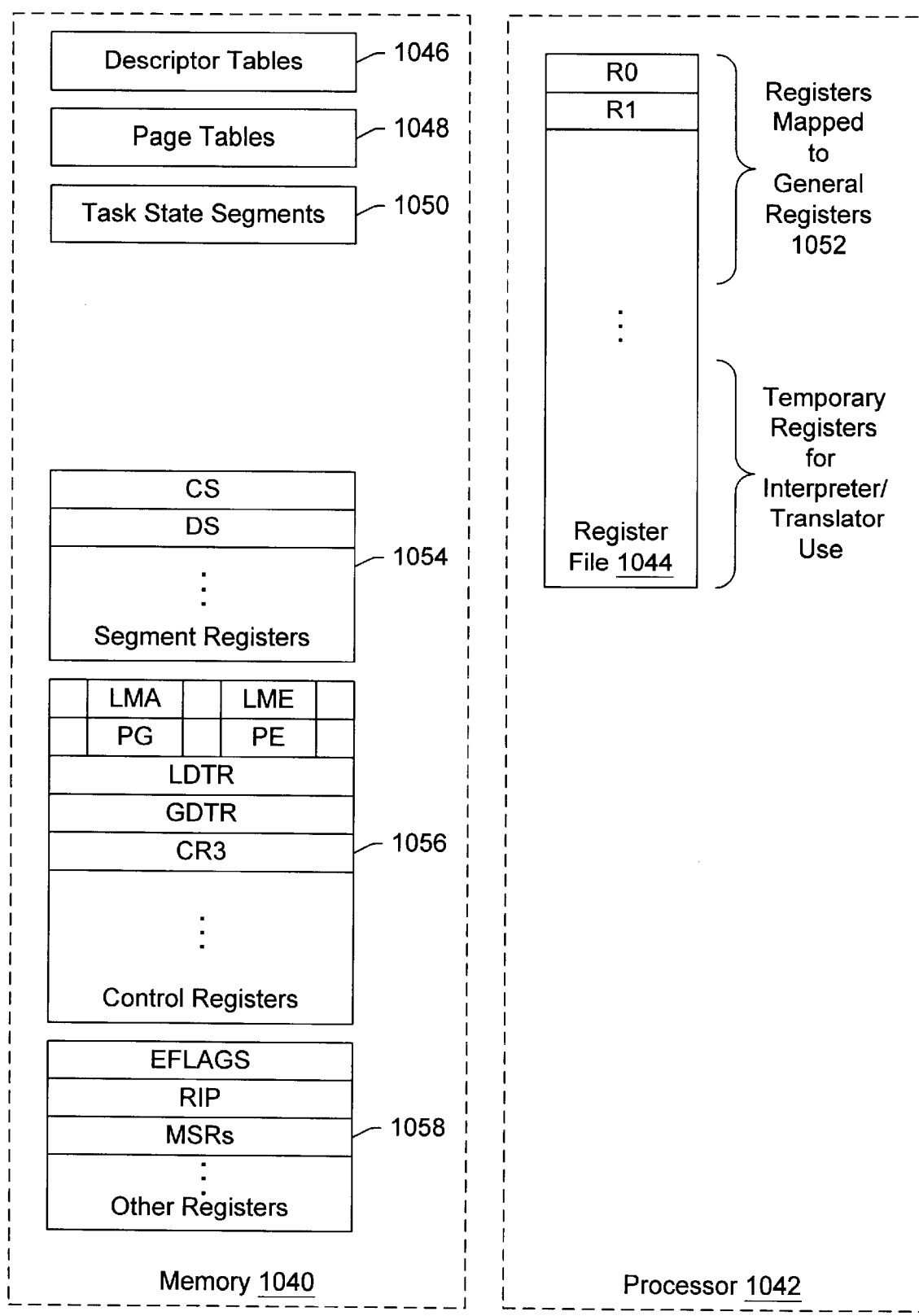
FIG. 13 is a block diagram illustrating a second embodiment of mapping non-native architected state.

While the example of FIG. 12 maps all of the non-native architected state to memory 1040, other embodiments may implement other mappings. In FIG. 13, for example, some of the general registers in register file 1044 are mapped to the general registers 1052. Accordingly, if a non-native instruction has a general register as an operand, the interpreter accesses the corresponding register in register file 1044. Similarly, the translator generates a translated instruction having the corresponding register in register file 1044 as an operand. Other architected state may still be accessed via memory operations in the embodiment of FIG. 13. Other registers in register file 1044 which are not assigned to non-native architected state may again be used as temporary registers for interpreter or translator use, as described above.

While the embodiment of FIG. 13 illustrates mapping the general registers 1052 to registers in register file 1044, any other non-native architected state may be mapped to registers in register file 1044. For example, any of segment registers 1054, control registers 1056, or other registers 1058 (or portions of any of these registers) may be mapped to register file 1044, as desired.

Figure 14:
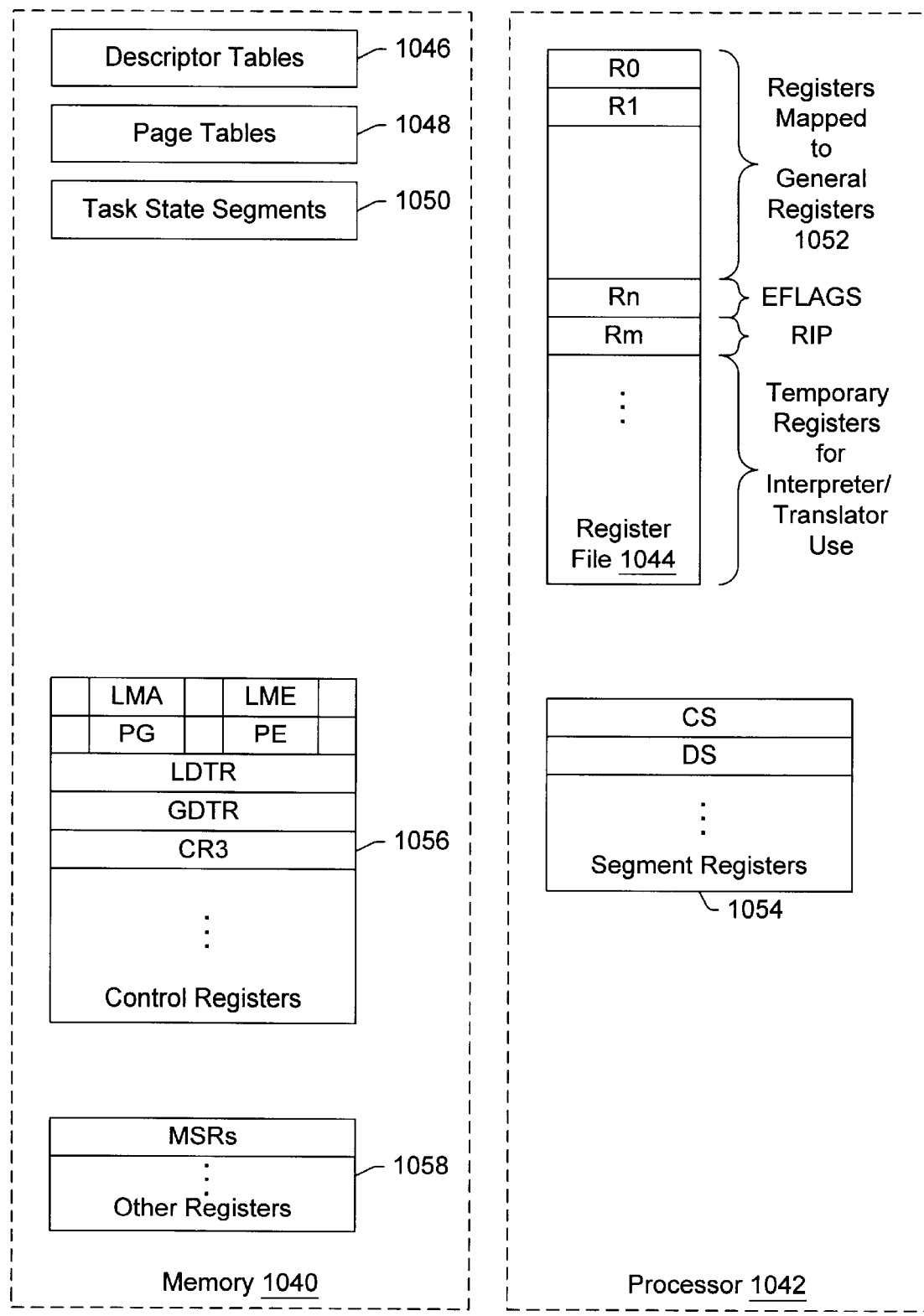
FIG. 14 is a block diagram illustrating a third embodiment of mapping non-native architected state.

FIG. 14 illustrates another example in which the general registers 1052 and the EFLAGS and RIP registers are mapped to registers in register file 1044. Additionally, in the example of FIG. 14, the segment registers 1054 are implemented in hardware in processor 1042. More specifically, processor 1042 may not only implement storage for segment registers 1054, but may also include logic to generate the operating mode for instructions based on the information in the segment registers. Furthermore, for compatibility modes, the logic may include limit checks and attribute checks to ensure that accesses to the segment attempted by the non-native instructions (or the non-native instructions in the interpreter or the translated code sequence which correspond to the non-native instructions) are permitted.

Similarly, other embodiments may implement various control registers 1056 or other registers 1058 in hardware, including corresponding logic to act on the contents of the registers as defined in the non-native architecture. Generally, various embodiments of processor 1042 may implement any non-native architected state in hardware. Certain architected state may generally be implemented in memory since the non-native processor architecture defines the state to be in memory (e.g. descriptor tables 1046, pages tables 1048, and task state segments 1050). Such memory-based architected state may be cached in caches within processor 1042 (e.g. TLBs for page table information, hidden segment register portions for segment descriptor information, etc.).

As the above discussion illustrates, the non-native architected state may be stored in any storage location. Generally, a storage location is a location capable of storing a value. Storage locations may include, in various embodiments, a memory location, a general register mapped to the non-native architected state, or a special purpose register (which may include additional hardware to interpret the contents of the register), depending upon the embodiment. Additionally, storage locations could include a scratch pad RAM (such as a portion of a cache predetermined to be used as scratch pad RAM).

Figure 15:
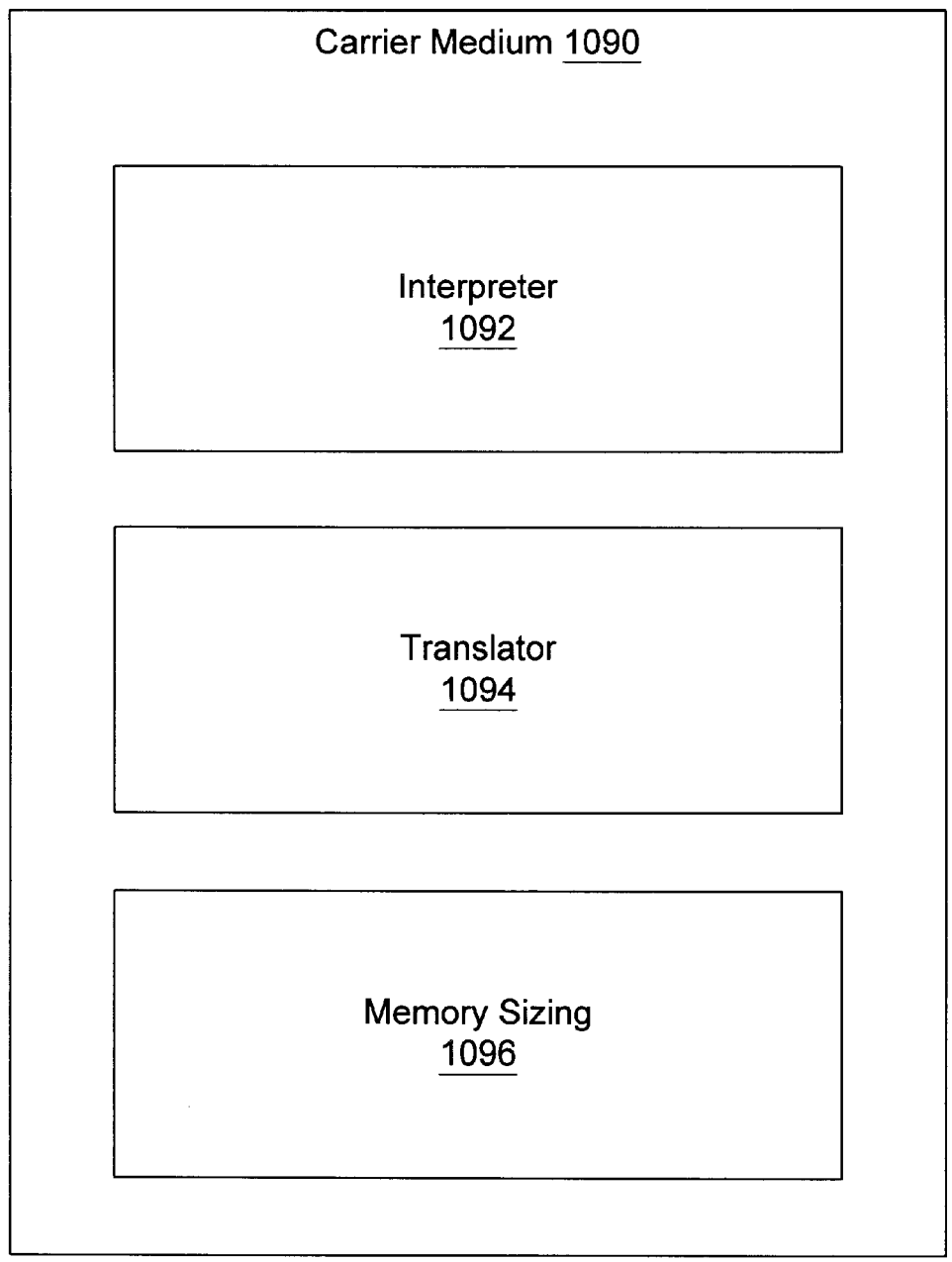
FIG. 15 is a block diagram of one embodiment of a carrier medium.

FIG. 15 is a block diagram of one embodiment of a carrier medium 1090. Other embodiments are possible and contemplated. In the embodiment of FIG. 15, carrier medium 1090 stores an interpreter program 1092 and a translator program 1094. Additionally, the carrier medium 1090 may further store a memory sizing code sequence 1096 corresponding to the flowchart of FIG. 8.

Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link. Carrier medium 1090 may thus be coupled to a computer system including processor 1042, may be part of a computer system including processor 1042, or may be a communication medium on which the computer system is capable of communicating. Computer systems including processor 1042 may be of any construction. For example, computer systems similar to those shown in FIGS. 16 and 17 may be suitable.

Interpreter program 1090 may operate according to the flowchart of FIG. 10. Translator program 1094 may operate according to the flowchart of FIG. 11. Generally, interpreter program 1092 and translator program 1094 may each comprise code sequences including native instructions.

Computer Systems

Figure 16:
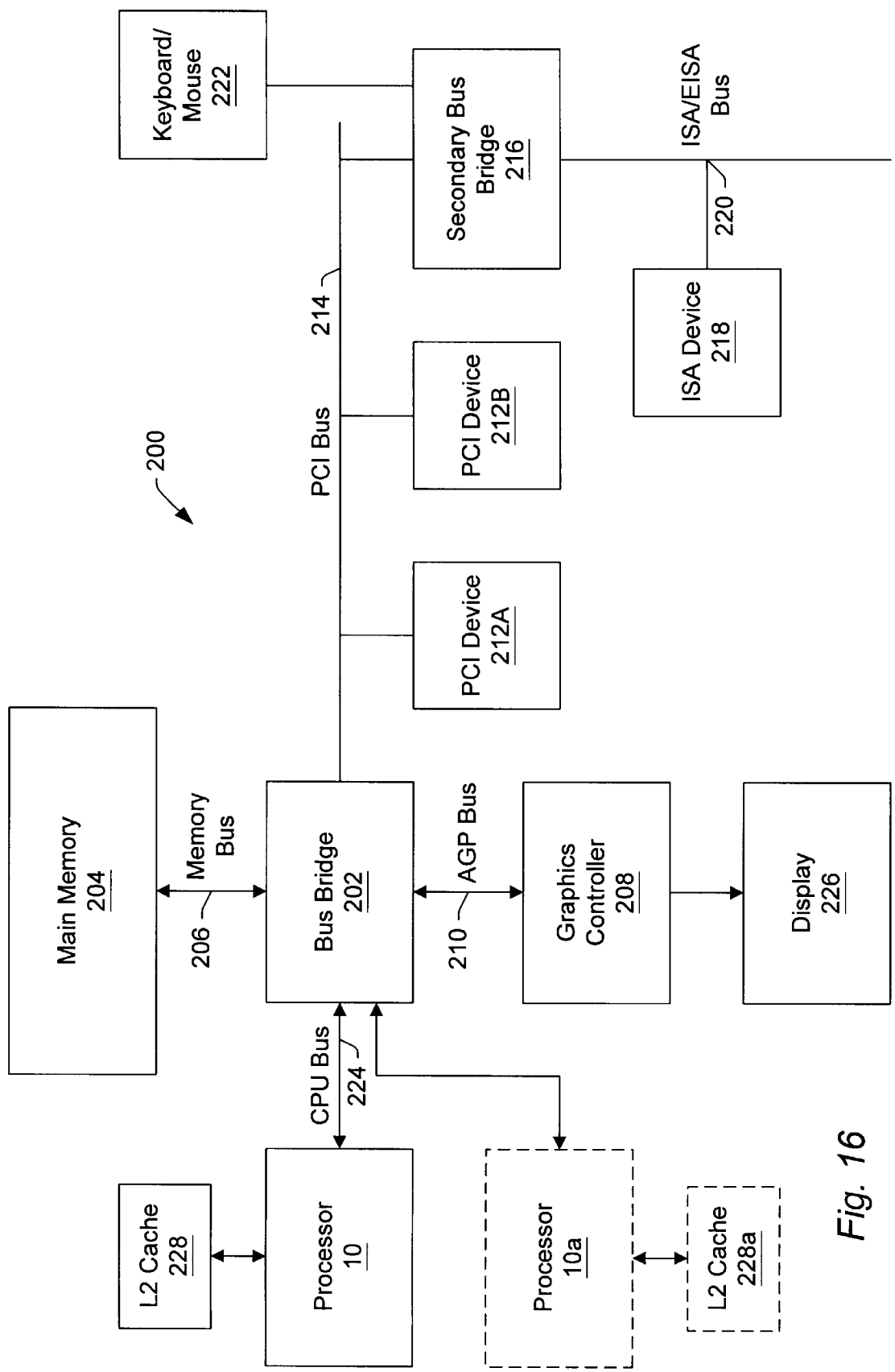
FIG. 16 is a block diagram of one embodiment of a computer system including the processor shown in FIG. 1.

Turning now to FIG. 16, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 228. Together, CPU bus 224 and the interface to L2 cache 228 may comprise an external interface to which external interface unit 18 may couple.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM) or Rambus DRAM (RDRAM) may be suitable.

PCI devices 212A–212B are illustrative of a variety of peripheral devices. The peripheral devices may include devices for communicating with another computer system to which the devices may be coupled (e.g. network interface cards, modems, etc.). Additionally, peripheral devices may include other devices, such as, for example, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may be connected to bus bridge 202 via an independent bus (as shown in FIG. 16) or may share CPU bus 224 with processor 10. Furthermore, processor 10a may be coupled to an optional L2 cache 228a similar to L2 cache 228.

Figure 17:
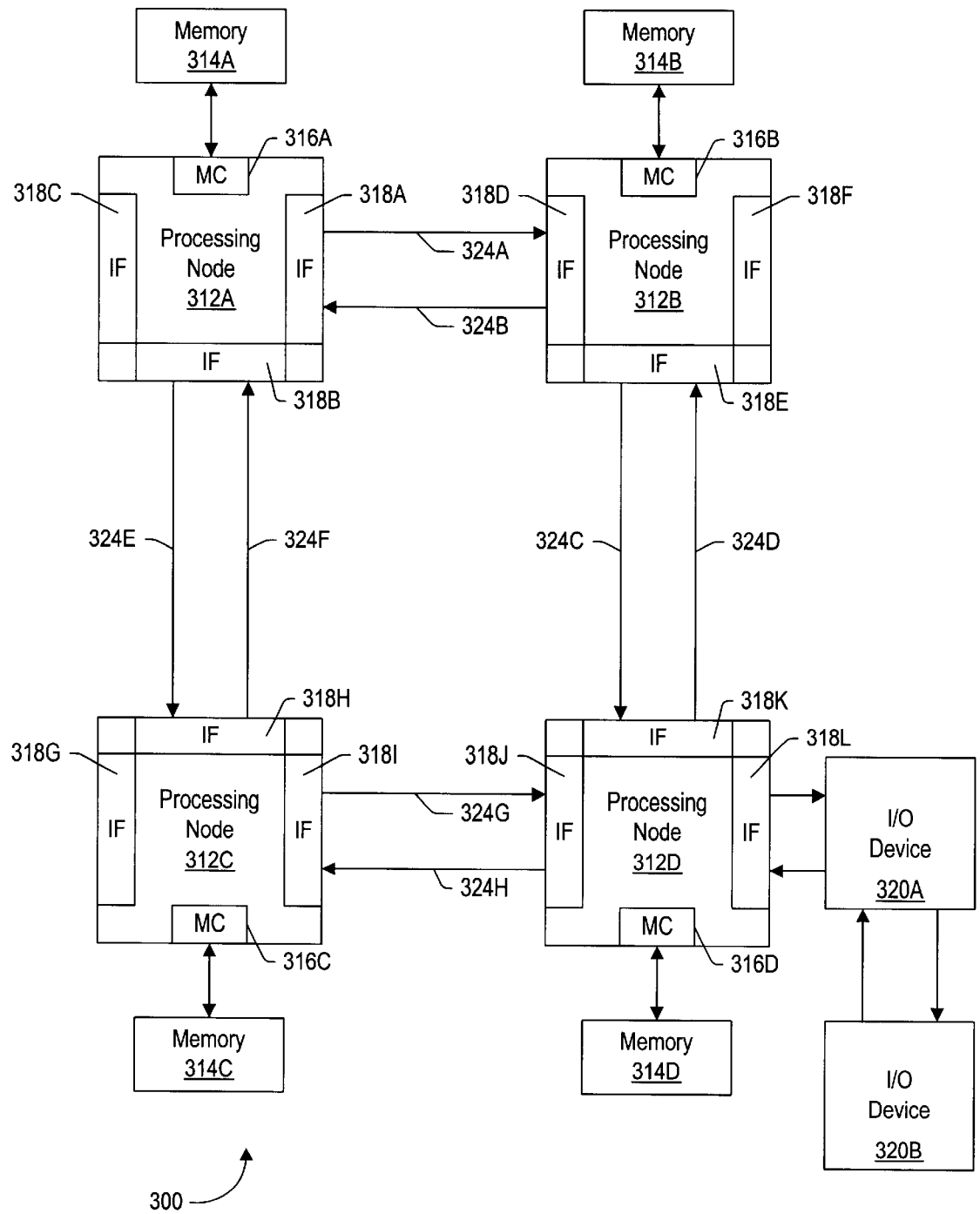
FIG. 17 is a block diagram of another embodiment of a computer system including the processor shown in FIG. 1.

Turning now to FIG. 17, another embodiment of a computer system 300 is shown. Other embodiments are possible and contemplated. In the embodiment of FIG. 17, computer system 300 includes several processing nodes 312A, 312B, 312C, and 312D. Each processing node is coupled to a respective memory 314A–314D via a memory controller 316A–316D included within each respective processing node 312A–312D. Additionally, processing nodes 312A–312D include interface logic used to communicate between the processing nodes 312A–312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A–320B in a daisy chain configuration) via interface logic 318L. Other processing nodes may communicate with other I/O devices in a similar fashion.

Processing nodes 312A–312D implement a packet-based link for inter-processing node communication. In the present embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C–324H are used to transmit packets between other processing nodes as illustrated in FIG. 17. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the PCI bus or ISA bus). Furthermore, the link may be operated in a noncoherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 17. Any suitable routing algorithm may be used. Other embodiments of computer system 300 may include more or fewer processing nodes then the embodiment shown in FIG. 17.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A–312D, in addition to a memory controller and interface logic, may include one or more processors. Broadly speaking, a processing node comprises at least one processor and may optionally include a memory controller for communicating with a memory and other logic as desired. More particularly, each processing node 312A–312D may comprise one or more copies of processor 10. External interface unit 18 may includes the interface logic 318 within the node, as well as the memory controller 316.

Memories 314A–314D may comprise any suitable memory devices. For example, a memory 314A–314D may comprise one or more RAMBUS DRAMs (RDRAMs), synchronous DRAMs (SDRAMs), static RAM, etc. The address space of computer system 300 is divided among memories 314A–314D. Each processing node 312A–312D may include a memory map used to determine which addresses are mapped to which memories 314A–314D, and hence to which processing node 312A–312D a memory request for a particular address should be routed. In one embodiment, the coherency point for an address within computer system 300 is the memory controller 316A–316D coupled to the memory storing bytes corresponding to the address. In other words, the memory controller 316A–316D is responsible for ensuring that each memory access to the corresponding memory 314A–314D occurs in a cache coherent fashion. Memory controllers 316A–316D may comprise control circuitry for interfacing to memories 314A–314D. Additionally, memory controllers 316A–316D may include request queues for queuing memory requests.

Generally, interface logic 318A–318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A–320B may be any suitable I/O devices. For example, I/O devices 320A–320B may include devices for communicate with another computer system to which the devices may be coupled (e.g. network interface cards or modems). Furthermore, I/O devices 320A–320B. may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

Numerous variations and modifications will become apparent to those skilled in the art once the above disclosure is fully appreciated. It is intended that the following claims be interpreted to embrace all such variations and modifications.

What is claimed is:

1. An apparatus for a processor, the apparatus comprising:
   circuitry configured to perform one or more canonical checks for a data reference and a segment limit check on an effective address of the data reference, wherein a canonical check is a check to ensure, for an address of the data reference, that each address bit that is not included in an implemented address space of the processor is equal to a most significant address bit that is included in the implemented address space; and
   a first circuit coupled to the circuitry and coupled to receive an indication of an operating mode of the processor and an indication of the segment corresponding to the data reference, wherein the first circuit is configured to select, responsive to the operating mode of the processor and the segment, one or more of: a first result of the segment limit check and a second result of the one or more canonical checks for generating an exception indication for the data reference.

2. An apparatus for a processor, the apparatus comprising:
   circuitry configured to perform one or more canonical checks for a data reference and a segment limit check on an effective address of the data reference; and
   a first circuit coupled to the circuitry and coupled to receive an indication of an operating mode of the processor and an indication of the segment corresponding to the data reference, wherein the first circuit is configured to select, responsive to the operating mode of the processor and the segment, one or more of: a first result of the segment limit check and a second result of the one or more canonical checks for generating an exception indication for the data reference, wherein the one or more canonical checks include a first canonical check on the effective address and a second canonical check on a linear address of the data reference, and wherein the second result is the result of the first canonical check, and a third result is the result of the second canonical check, and wherein the first circuit is further configured to select the third result for generating the exception indication responsive to the operating mode and the segment.

3. The apparatus as recited in claim 2, wherein the first circuit is configured to select the first result and not select the second result and the third result if the operating mode specifies a segmented address space in which a linear address size is less than or equal to 32 bits.

4. The apparatus as recited in claim 2, wherein the first circuit is configured to select the first result if the operating mode specifies a segmented address space in which a linear address size in at least some segments is greater than 32 bits.

5. The apparatus as recited in claim 4 wherein the first circuit is further configured to select the third result and not select the second result if the segment is a table segment.

6. The apparatus as recited in claim 2 wherein the first circuit is configured to select the third result if the operating mode specifies an unsegmented address space.

7. The apparatus as recited in claim 6 wherein the first circuit is further configured to select the second result and not select the first result if the segment is a user segment.

8. The apparatus as recited in claim 6 wherein the first circuit is further configured to select the first result and not select the second result if the segment is a table segment.

9. The apparatus as recited in claim 2 wherein the circuitry comprises a second circuit located in an address generation unit configured to generate the effective address, wherein the second circuit is configured to generate the second result and to transmit the indication to the first circuit, and wherein the first circuit is located in a load/store unit.

10. An apparatus for a processor comprising:
a circuit configured to output an address of a data reference, the circuit coupled to receive a control input and configured to output the address either truncated to a predetermined number of bits or not truncated dependent on the control input; and
a control circuit configured to generate the control input responsive to a segment of the data reference and an operating mode of the processor, wherein the control circuit is configured to generate the control input to truncate if the operating mode specifies a segmented address space in which a linear address size in at least some segments is greater than 32 bits and the segment is a user segment.

11. The apparatus as recited in claim 10 wherein the control circuit is configured to generate the control input to truncate if the operating mode specifies a segmented address space in which a linear address size is less than or equal to 32 bits.

12. The apparatus as recited in claim 10 wherein the control circuit is configured to generate the control input not to truncate if the operating mode specifies an unsegmented address space.

13. The apparatus as recited in claim 10 further comprising a register coupled to the control circuit, wherein the register is configured to store a first indication, and wherein the control circuit is configured to generate the control input not to truncate in response to a first state of the indication even if truncating would otherwise be performed based on the operating mode and segment.

14. The apparatus as recited in claim 13, wherein the register is a model specific register.

15. The apparatus as recited in claim 10 wherein the circuit is configured to select between an output of a first adder having a first size equal to the size of the address and an output of a second adder having a second size equal to the predetermined number of bits.

16. The apparatus as recited in claim 10 wherein the circuit comprises a truncation circuit coupled to receive the address and to selectively substitute binary zeros for the most significant bits of the address above the predetermined number of bits in response to the control input.

17. A method comprising:
setting an indication in a register to a first state which prevents truncation of data reference addresses even if truncation would be performed according to an operating mode of a processor, wherein the processor includes the register;
performing a plurality of data references to determine a size of memory included in a system; and
setting the indication to a second state which allows truncation of data reference addresses according to the operating mode of the processor.

18. The method as recited in claim 17 wherein the performing comprises:
storing a first base address in a segment base address portion of a segment register;
performing a first plurality of the plurality of data references relative to the first segment base address;
storing a second base address in the segment base address portion of the segment register; and
performing a second plurality of the plurality of data references relative to the second segment base address.

19. The method as recited in claim 18 wherein each of the first base address and the second base address include at least one non-zero bit in a bit location subject to the truncation.

20. A computer readable medium comprising a plurality of instructions which, when executed, implement a method comprising:
setting an indication in a register to a first state which prevents truncation of data reference addresses even if truncation would be performed according to an operating mode of a processor, wherein the processor includes the register;
performing a plurality of data references to determine a size of memory included in a system; and
setting the indication to a second state which allows truncation of data reference addresses according to the operating mode of the processor.

21. The computer readable medium as recited in claim 20 wherein the performing comprises:
storing a first base address in a segment base address portion of a segment register;
performing a first plurality of the plurality of data references relative to the first segment base address;
storing a second base address in the segment base address portion of the segment register; and
performing a second plurality of the plurality of data references relative to the second segment base address.

22. The computer readable medium as recited in claim 21, wherein each of the first base address and the second base address include at least one non-zero bit in a bit location subject to the truncation.

23. A computer system comprising:

a memory; and at least one processor coupled to the memory, wherein the processor is configured to perform one or more canonical checks for a data reference to the memory and a segment limit check on an effective address of the data reference, wherein a canonical check is a check to ensure, for an address of the data reference, that each address bit that is not included in an implemented address space is equal to a most significant address bit that is included in the implemented address space, and wherein the processor is configured to select, responsive to an operating mode and the segment corresponding to the data reference, one or more of: a first result of the segment limit check and a second result of the one or more canonical checks for generating an exception for the data reference.

24. The computer system as recited in claim 23 wherein the one or more canonical checks include a first canonical check on the effective address and a second canonical check on a linear address of the data reference, and wherein the second result is the result of the first canonical check, and a third result is the result of the second canonical check, and wherein the processor is further configured to select the third result for generating the exception responsive to the operating mode and the segment.

25. The computer system as recited in claim 24, wherein the processor is configured to select the first result and not select the second result and the third result if the operating mode specifies a segmented address space in which a linear address size is less than or equal to 32 bits.

26. The computer system as recited in claim 24, wherein the processor is configured to select the first result if the operating mode specifies a segmented address space in which a linear address size in at least some segments is greater than 32 bits.

27. The computer system as recited in claim 26, wherein the processor is further configured to select the third result and not select the second result if the segment is a table segment.

28. The computer system as recited in claim 24 wherein the processor is configured to select the third result if the operating mode specifies an unsegmented address space.

29. The computer system as recited in claim 28 herein the processor is further configured to select the second result and not select the first result if the segment is a user segment.

30. The computer system as recited in claim 28 wherein the processor is further configured to select the first result and not select the second result if the segment is a table segment.

31. A computer system comprising:

a memory; and at least one processor coupled to the memory, wherein the processor configured to generate an address of a data reference to the memory, wherein the processor is configured to truncate the address to a predetermined number of bits or not truncate the address dependent on a segment of the data reference and an operating mode, wherein the processor is configured to truncate the address if the operating mode specifies a segmented address space in which a linear address size in at least some segments is greater than 32 bits and the segment is a user segment.

32. The computer system as recited in claim 31 wherein the processor is configured to truncate the address if the operating mode specifies a segmented address space in which a linear address size is less than or equal to 32 bits.

33. The computer system as recited in claim 31 wherein the processor is configured not to truncate the address if the operating mode specifies an unsegmented address space.

\* \* \* \* \*